US008968083B2

(12) United States Patent
Nicely et al.

(10) Patent No.: US 8,968,083 B2
(45) Date of Patent: Mar. 3, 2015

(54) GAMING SYSTEM AND METHOD FOR DYNAMICALLY GROUPING GAMING DEVICES TO PROVIDE PROGRESSIVE AWARDS

(75) Inventors: Mark C. Nicely, Daly City, CA (US); Ernest M. Lafky, Oakland, CA (US)

(73) Assignee: IGT, Las Vegas, NV (US)

( * ) Notice: Subject to any disclaimer, the term of this patent is extended or adjusted under 35 U.S.C. 154(b) by 1126 days.

(21) Appl. No.: 12/617,412

(22) Filed: Nov. 12, 2009

(65) Prior Publication Data

US 2011/0111843 A1 May 12, 2011

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(Continued)

(52) U.S. Cl.

CPC .............. *G07F 17/32* (2013.01); *G07F 17/323* (2013.01); *G07F 17/3237* (2013.01); *G07F 17/3239* (2013.01); *G07F 17/3258* (2013.01); *G07F 17/3262* (2013.01); *G07F 17/34* (2013.01)

USPC .................... 463/27; 463/20; 463/25; 463/29

(58) Field of Classification Search

CPC ............ G07F 17/3244; G07F 17/3234; G07F 17/3258

USPC .......................................... 463/20, 25, 27, 29

See application file for complete search history.

(56) References Cited

U.S. PATENT DOCUMENTS 1,978,395 A 10/1934 Groetchen
3,420,525 A 1/1969 Waders (Continued)

FOREIGN PATENT DOCUMENTS

AU 199717601 B2 9/1997
AU 722969 6/1998

(Continued)

OTHER PUBLICATIONS

Letter from Marvin A. Motsenbocker of Mots Law dated Jul. 8, 2011 regarding Third Party Submission in Published Application Under 37 C.F.R. 1.99 filed for U.S. Appl. No. 12/617,412 (1 page).

(Continued)

*Primary Examiner* — James S McClellan
*Assistant Examiner* — Wei Lee
(74) *Attorney, Agent, or Firm* — Neal, Gerber & Eisenberg LLP

(57) ABSTRACT

A gaming system enables players of a group of gaming devices to wager on progressive or other awards for that group and tracks an amount of player activity at the group. If player activity of the group exceeds an upper reconfiguration threshold, the gaming system disassociates one or more gaming devices from the group to reduce the amount of player activity. If the player activity of the group falls below a lower reconfiguration threshold, the gaming system associates one or more additional gaming devices with that group to increase player activity. Reallocation of gaming devices can occur following a player winning the award for the group. The system can incrementally increase an award reset amount, while reducing the odds of winning the award, to maintain a desired range of gaming experiences. The system can also enable a player to select an initial groups based on a characteristic of that player.

15 Claims, 15 Drawing Sheets

(51) Int. Cl.
*G07F 17/32* (2006.01)
*G07F 17/34* (2006.01)

(56) References Cited

U.S. PATENT DOCUMENTS

| | | | |
|---|---|---|---|
| 3,642,287 | A | 2/1972 | Lally et al. |
| 3,735,987 | A | 5/1973 | Ohki |
| 4,198,052 | A | 4/1980 | Gauselmann |
| 4,326,351 | A | 4/1982 | Heywood et al. |
| 4,695,053 | A | 9/1987 | Vazquez, Jr. et al. |
| 5,152,529 | A | 10/1992 | Okada |
| 5,280,909 | A | 1/1994 | Tracy |
| 5,308,065 | A | 5/1994 | Bridgeman et al. |
| 5,332,228 | A | 7/1994 | Schultz |
| 5,344,144 | A | 9/1994 | Canon |
| 5,364,100 | A | 11/1994 | Ludlow et al. |
| 5,364,104 | A | 11/1994 | Jones et al. |
| 5,377,973 | A | 1/1995 | Jones et al. |
| 5,395,111 | A | 3/1995 | Inoue |
| 5,423,539 | A | 6/1995 | Nagao |
| 5,431,408 | A | 7/1995 | Adams |
| 5,449,173 | A | 9/1995 | Thomas et al. |
| 5,584,764 | A | 12/1996 | Inoue |
| 5,664,998 | A | 9/1997 | Seelig et al. |
| 5,752,881 | A | 5/1998 | Inoue |
| 5,766,076 | A | 6/1998 | Pease et al. |
| 5,769,716 | A | 6/1998 | Saffari et al. |
| 5,772,506 | A | 6/1998 | Marks et al. |
| 5,823,873 | A | 10/1998 | Moody |
| 5,833,536 | A | 11/1998 | Davids et al. |
| 5,833,537 | A | 11/1998 | Barrie |
| 5,851,147 | A | 12/1998 | Stupak et al. |
| 5,855,515 | A | 1/1999 | Pease et al. |
| 5,885,158 | A | 3/1999 | Torango et al. |
| 5,984,782 | A | 11/1999 | Inoue |
| 5,997,400 | A | 12/1999 | Seelig et al. |
| 5,997,401 | A | 12/1999 | Crawford |
| 6,033,307 | A | 3/2000 | Vancura |
| 6,056,642 | A | 5/2000 | Bennett |
| 6,059,289 | A | 5/2000 | Vancura |
| 6,068,552 | A | 5/2000 | Walker et al. |
| 6,086,066 | A | 7/2000 | Takeuchi et al. |
| 6,089,976 | A | 7/2000 | Schneider et al. |
| 6,089,977 | A | 7/2000 | Bennett |
| 6,110,043 | A | 8/2000 | Olsen |
| 6,120,031 | A | 9/2000 | Adams |
| 6,120,376 | A | 9/2000 | Cherry |
| 6,142,875 | A | 11/2000 | Kodachi et al. |
| 6,146,273 | A | 11/2000 | Olsen |
| 6,159,095 | A | 12/2000 | Frohm et al. |
| 6,159,096 | A | 12/2000 | Yoseloff |
| 6,190,254 | B1 | 2/2001 | Bennett |
| 6,210,275 | B1 | 4/2001 | Olsen |
| 6,220,959 | B1 | 4/2001 | Holmes, Jr. et al. |
| 6,251,013 | B1 | 6/2001 | Bennett |
| 6,270,411 | B1 | 8/2001 | Gura et al. |
| 6,290,600 | B1 | 9/2001 | Glasson |
| 6,299,165 | B1 | 10/2001 | Nagano |
| 6,299,170 | B1 | 10/2001 | Yoseloff |
| 6,305,686 | B1 | 10/2001 | Perrie et al. |
| 6,311,976 | B1 | 11/2001 | Yoseloff et al. |
| 6,315,663 | B1 | 11/2001 | Sakamoto |
| 6,319,124 | B1 | 11/2001 | Baerlocher et al. |
| 6,322,078 | B1 | 11/2001 | Adams |
| 6,358,144 | B1 | 3/2002 | Kadlic et al. |
| 6,394,902 | B1 | 5/2002 | Glavich et al. |
| 6,413,162 | B1 | 7/2002 | Baerlocher et al. |
| 6,419,579 | B1 | 7/2002 | Bennett |
| 6,435,511 | B1 | 8/2002 | Vancura et al. |
| 6,439,993 | B1 | 8/2002 | O'Halloran |
| 6,481,713 | B2 | 11/2002 | Perrie et al. |
| 6,494,454 | B2 | 12/2002 | Adams |
| 6,589,114 | B2 | 7/2003 | Rose |
| 6,599,193 | B2 | 7/2003 | Baerlocher et al. |
| 6,604,740 | B1 | 8/2003 | Singer et al. |
| 6,616,142 | B2 | 9/2003 | Adams |
| 6,659,864 | B2 | 12/2003 | McGahn et al. |
| 6,676,512 | B2 | 1/2004 | Fong et al. |
| 6,780,109 | B2 | 8/2004 | Kaminkow |
| 6,780,111 | B2 | 8/2004 | Cannon et al. |
| 6,805,349 | B2 | 10/2004 | Baerlocher et al. |
| 6,837,788 | B2 | 1/2005 | Cannon |
| 6,866,583 | B2 | 3/2005 | Glavich et al. |
| 6,905,406 | B2 | 6/2005 | Kaminkow et al. |
| 6,910,962 | B2 | 6/2005 | Marks et al. |
| 6,921,335 | B2 | 7/2005 | Rodgers et al. |
| 7,029,395 | B1 | 4/2006 | Baerlocher |
| 7,094,154 | B2 | 8/2006 | Kellerman et al. |
| 7,108,603 | B2 | 9/2006 | Olive |
| 7,226,359 | B2 | 6/2007 | Bussick et al. |
| 7,238,109 | B2 | 7/2007 | McGahn et al. |
| 7,255,645 | B2 | 8/2007 | Steil et al. |
| 7,297,059 | B2 | 11/2007 | Vancura et al. |
| 7,357,716 | B2 | 4/2008 | Marks et al. |
| 7,374,486 | B2 | 5/2008 | Baerlocher |
| 7,454,380 | B2 | 11/2008 | Garahi et al. |
| 7,618,321 | B2 | 11/2009 | Crawford, III et al. |
| 2001/0036857 | A1* | 11/2001 | Mothwurf et al. .............. 463/25 |
| 2002/0010017 | A1 | 1/2002 | Bennett |
| 2002/0068623 | A1 | 6/2002 | Gauselmann |
| 2002/0111215 | A1 | 8/2002 | Wah Chan |
| 2002/0142846 | A1* | 10/2002 | Paulsen ........................... 463/43 |
| 2003/0093168 | A1* | 5/2003 | Nagaoka ......................... 700/91 |
| 2003/0157981 | A1 | 8/2003 | Marks et al. |
| 2003/0203753 | A1 | 10/2003 | Muir et al. |
| 2003/0207710 | A1 | 11/2003 | Rodgers et al. |
| 2003/0224852 | A1* | 12/2003 | Walker et al. ................... 463/20 |
| 2004/0012145 | A1 | 1/2004 | Inoue |
| 2004/0014516 | A1 | 1/2004 | Inoue |
| 2004/0014517 | A1 | 1/2004 | Inoue |
| 2004/0018866 | A1 | 1/2004 | Inoue |
| 2004/0026854 | A1 | 2/2004 | Inoue |
| 2004/0036218 | A1 | 2/2004 | Inoue |
| 2004/0038726 | A1 | 2/2004 | Inoue |
| 2004/0043809 | A1 | 3/2004 | Gomez et al. |
| 2004/0048644 | A1 | 3/2004 | Gerrard et al. |
| 2004/0053669 | A1 | 3/2004 | Gerrard et al. |
| 2004/0053672 | A1 | 3/2004 | Baerlocher |
| 2004/0053676 | A1 | 3/2004 | Rodgers |
| 2004/0072612 | A1 | 4/2004 | Rodgers et al. |
| 2004/0097280 | A1 | 5/2004 | Gauselmann |
| 2004/0137982 | A1 | 7/2004 | Cuddy et al. |
| 2004/0147306 | A1 | 7/2004 | Randall et al. |
| 2004/0152511 | A1 | 8/2004 | Nicely et al. |
| 2004/0204216 | A1 | 10/2004 | Schugar |
| 2005/0020344 | A1 | 1/2005 | Kaminkow |
| 2005/0037837 | A1* | 2/2005 | Rowe .............................. 463/25 |
| 2005/0049035 | A1 | 3/2005 | Baerlocher et al. |
| 2005/0064924 | A1 | 3/2005 | Glavich et al. |
| 2005/0070354 | A1 | 3/2005 | Baerlocher et al. |
| 2005/0096114 | A1 | 5/2005 | Cannon et al. |
| 2005/0101380 | A1 | 5/2005 | Glavich et al. |
| 2005/0143166 | A1* | 6/2005 | Walker et al. ................... 463/25 |
| 2005/0148384 | A1 | 7/2005 | Marks et al. |
| 2005/0209001 | A1 | 9/2005 | Moshal |
| 2005/0227754 | A1 | 10/2005 | Kaminkow et al. |
| 2005/0239542 | A1* | 10/2005 | Olsen .............................. 463/27 |
| 2006/0025195 | A1 | 2/2006 | Pennington et al. |
| 2006/0030403 | A1 | 2/2006 | Lafky et al. |
| 2006/0040723 | A1 | 2/2006 | Baerlocher et al. |
| 2006/0040732 | A1 | 2/2006 | Baerlocher et al. |
| 2006/0040733 | A1 | 2/2006 | Baerlocher et al. |
| 2006/0040734 | A1 | 2/2006 | Baerlocher et al. |
| 2006/0040736 | A1 | 2/2006 | Baerlocher et al. |
| 2006/0079331 | A1 | 4/2006 | Moshal |
| 2006/0084499 | A1 | 4/2006 | Moshal |
| 2006/0094509 | A1 | 5/2006 | Michaelson et al. |
| 2006/0100019 | A1* | 5/2006 | Hornik et al. ................... 463/42 |
| 2006/0183527 | A1 | 8/2006 | Honour |
| 2006/0183535 | A1 | 8/2006 | Marks et al. |
| 2006/0287097 | A1 | 12/2006 | Moshal |
| 2007/0054733 | A1 | 3/2007 | Baerlocher |
| 2007/0060246 | A1 | 3/2007 | Baerlocher et al. |
| 2007/0060271 | A1 | 3/2007 | Cregan et al. |

(56) References Cited

U.S. PATENT DOCUMENTS

| | | | |
|---|---|---|---|
| 2007/0060314 | A1 | 3/2007 | Baerlocher et al. |
| 2007/0060321 | A1 | 3/2007 | Vasquez et al. |
| 2007/0060365 | A1 | 3/2007 | Tien et al. |
| 2007/0072678 | A1 | 3/2007 | Dagres |
| 2007/0077981 | A1 | 4/2007 | Hungate et al. |
| 2007/0105619 | A1 | 5/2007 | Kniesteadt et al. |
| 2007/0129129 | A1 | 6/2007 | Tinghitella |
| 2007/0129131 | A1 | 6/2007 | Kaminkow et al. |
| 2007/0155480 | A1 | 7/2007 | Brosnan et al. |
| 2007/0178955 | A1 | 8/2007 | Mills |
| 2007/0191088 | A1 | 8/2007 | Breckner et al. |
| 2007/0218975 | A1 | 9/2007 | Iddings et al. |
| 2007/0218982 | A1 | 9/2007 | Baerlocher |
| 2007/0293293 | A1 | 12/2007 | Baerlocher et al. |
| 2007/0298857 | A1 | 12/2007 | Schlottmann et al. |
| 2007/0298874 | A1 | 12/2007 | Baerlocher et al. |
| 2007/0298875 | A1 | 12/2007 | Baerlocher et al. |
| 2008/0008577 | A1 | 1/2008 | Cohen |
| 2008/0020832 | A1 | 1/2008 | Iddings et al. |
| 2008/0020834 | A1 | 1/2008 | Breckner et al. |
| 2008/0020846 | A1 | 1/2008 | Vasquez et al. |
| 2008/0020847 | A1 | 1/2008 | Kniesteadt et al. |
| 2008/0039191 | A1 | 2/2008 | Cuddy |
| 2008/0045344 | A1 | 2/2008 | Schlottmann et al. |
| 2008/0051174 | A1 | 2/2008 | Fiden |
| 2008/0064502 | A1 | 3/2008 | Schlottmann et al. |
| 2008/0070676 | A1 | 3/2008 | Baerlocher et al. |
| 2008/0070677 | A1 | 3/2008 | Baerlocher et al. |
| 2008/0070678 | A1 | 3/2008 | Baerlocher et al. |
| 2008/0076496 | A1 | 3/2008 | Baerlocher et al. |
| 2008/0076531 | A1 | 3/2008 | Baerlocher et al. |
| 2008/0076532 | A1 | 3/2008 | Graham et al. |
| 2008/0076534 | A1 | 3/2008 | Iddings et al. |
| 2008/0076542 | A1 | 3/2008 | Iddings et al. |
| 2008/0076576 | A1 | 3/2008 | Graham et al. |
| 2008/0081690 | A1 | 4/2008 | Baerlocher et al. |
| 2008/0081691 | A1 | 4/2008 | Baerlocher et al. |
| 2008/0085771 | A1 | 4/2008 | Iddings et al. |
| 2008/0085772 | A1 | 4/2008 | Iddings et al. |
| 2008/0090650 | A1 | 4/2008 | Tarantino |
| 2008/0090651 | A1 | 4/2008 | Baerlocher |
| 2008/0096650 | A1 | 4/2008 | Baerlocher |
| 2008/0108404 | A1 | 5/2008 | Iddings et al. |
| 2008/0108410 | A1 | 5/2008 | Baerlocher |
| 2008/0108423 | A1 | 5/2008 | Benbrahim et al. |
| 2008/0108430 | A1 | 5/2008 | Evans |
| 2008/0108431 | A1 | 5/2008 | Cuddy et al. |
| 2008/0113763 | A1 | 5/2008 | Michaelson et al. |
| 2008/0113771 | A1 | 5/2008 | Baerlocher et al. |
| 2008/0139274 | A1 | 6/2008 | Baerlocher |
| 2008/0139290 | A1 | 6/2008 | Kniesteadt et al. |
| 2008/0153564 | A1 | 6/2008 | Baerlocher et al. |
| 2008/0176618 | A1 | 7/2008 | Toompere |
| 2008/0182655 | A1 | 7/2008 | De Waal et al. |
| 2008/0214286 | A1 | 9/2008 | Lutnick et al. |
| 2008/0220843 | A1 | 9/2008 | Kido |
| 2008/0274790 | A1 | 11/2008 | Cannon |
| 2009/0036202 | A1 | 2/2009 | Baerlocher et al. |
| 2009/0042645 | A1 | 2/2009 | Graham et al. |
| 2009/0088239 | A1 | 4/2009 | Iddings et al. |
| 2009/0088244 | A1 | 4/2009 | Nicely et al. |
| 2009/0098932 | A1* | 4/2009 | Longway ........................ 463/22 |
| 2009/0111561 | A1 | 4/2009 | Dewaal et al. |
| 2009/0111573 | A1 | 4/2009 | Iddings |
| 2009/0111574 | A1 | 4/2009 | Rowe |
| 2009/0124332 | A1 | 5/2009 | Baerlocher |
| 2009/0124346 | A1 | 5/2009 | Baerlocher |
| 2009/0124362 | A1 | 5/2009 | Cuddy et al. |
| 2009/0124363 | A1* | 5/2009 | Baerlocher et al. ............. 463/27 |
| 2009/0124364 | A1 | 5/2009 | Cuddy et al. |
| 2010/0022308 | A1 | 1/2010 | Hartmann et al. |
| 2010/0331071 | A1 | 12/2010 | Uchiyama et al. |

FOREIGN PATENT DOCUMENTS

| | | | |
|---|---|---|---|
| AU | 199917318 | A1 | 9/1999 |
| EP | 1184822 | | 7/1982 |
| EP | 0060019 | | 9/1982 |
| EP | 0874337 | | 10/1998 |
| EP | 0981119 | | 2/2000 |
| EP | 0984408 | | 3/2000 |
| EP | 1034017 | | 9/2000 |
| EP | 1205894 | | 10/2001 |
| EP | 1422673 | | 5/2004 |
| EP | 1513117 | | 3/2005 |
| GB | 2081952 | | 2/1982 |
| GB | 2090690 | | 7/1982 |
| GB | 2096376 | | 10/1982 |
| GB | 2097160 | | 10/1982 |
| GB | 2100905 | | 1/1983 |
| GB | 2105891 | | 3/1983 |
| GB | 2113881 | | 8/1983 |
| GB | 2117155 | | 10/1983 |
| GB | 2137392 | | 10/1984 |
| GB | 2161008 | | 1/1986 |
| GB | 2165385 | A | 4/1986 |
| GB | 2170643 | | 8/1986 |
| GB | 2180087 | A | 3/1987 |
| GB | 2181589 | | 4/1987 |
| GB | 2183882 | | 6/1987 |
| GB | 2191030 | | 12/1987 |
| GB | 2222712 | | 3/1990 |
| GB | 2225889 | | 6/1990 |
| GB | 2226436 | | 6/1990 |
| GB | 2242300 | | 9/1991 |
| GB | 2262642 | | 6/1993 |
| GB | 2322217 | A | 8/1998 |
| GB | 2335524 | A | 9/1999 |
| GB | 2393555 | A | 3/2004 |
| WO | WO9732285 | | 9/1997 |
| WO | WO0032286 | | 6/2000 |
| WO | WO0066235 | | 11/2000 |
| WO | WO0076606 | | 12/2000 |
| WO | WO0126019 | | 4/2001 |
| WO | WO03026756 | | 4/2003 |
| WO | WO2004025584 | | 3/2004 |
| WO | WO2006076294 | A2 | 7/2006 |
| WO | WO2007002935 | A2 | 1/2007 |
| WO | WO2007130444 | A2 | 11/2007 |
| WO | WO 2008/105359 | | 9/2008 |
| WO | WO 2009/099036 | | 8/2009 |

OTHER PUBLICATIONS

Third Party Submission in Published Application Under 37 C.F.R. 1.99 filed for U.S. Appl. No. 12/617,412, dated Jul. 8, 2011 (3 pages).

Barn Yard Article, written by Strictly Slots, Aristocrat Technology, published Mar. 2002.

Bejeweled Web page, written by PopCap Games, http://www.popcap.com, published prior to Sep. 9, 2005.

Black Swan Paytable Display written by IGT, published prior to 2001.

Break the Spell Advertisement written by Atronic Casino Technology, Ltd., published in 1999.

Cash Chameleon Article written by Strictly Slots/Aristocrat Leisure Industries, PTY Ltd., published in Apr. 2001.

Catch a Wave Advertisement written by IGT, published in Dec. 2000.

Cossack Dance Advertisement written by Olympic Video Gaming, published prior to 2002.

Description of Expanding Symbol, written by IGT, published Sep. 1999.

Description of Gaming Machine with Animating Symbols, written by IGT, published Jan. 2000.

Description of Symbol Feature in Australian UFO Gaming Machine, written by Barcrest, Ltd., published 1995.

Description of Traveling Symbols, written by IGT, published Sep. 1999.

Double Diamond Line Advertisement written by Bally Gaming Systems, published in 2000.

(56) References Cited

OTHER PUBLICATIONS

Easy Street Advertisements and Articles, written by Casino Data Systems, published in 2000.
ENCHANTED FOREST™ Gaming Description from Aristocrat, available in 1994.
Enchanted Unicorn Advertisement written by IGT, published in 2001.
Fishin' Buddies Article published in Strictly Slots/Anchor Games, published in Apr. 2001.
Ghoulish Gamble Article, written by Strictly Slots, IGT, Sep. 2000.
Gold Fever Advertisement, written by Atronic Casino Technology, Ltd., published 1999.
Gold Fever Atronic Web page, written by Atronic Casino Technology, published Mar. 2002.
Goooaal! pp. 1-2, written by Bally Gaming, Inc., published Dec. 2000.
Jewel in the Crown Advertisements, written by Barcrest Ltd., published 1999.
Joker's Wild Advertisement written by IGT, published prior to 2001.
Kaboom Web page, written by WMS Gaming, http://www.wmsgaming.com/products/video/kaboom/index.php, published prior to Sep. 9, 2005.
Loco Loot Article written by Strictly Slots/Aristocrat Leisure Industries, PTY Ltd., published in May 2002.
Marshall Fey, Slot Machines a pictorial History of the First 100 Years, Liberty Bell Books, pp. 79, 150, 171, 231, published 1983.
Mountain Money Article written by Strictly Slots/Aristocrat Leisure Industries, PTY Ltd., published in Jun. 2002.
Mystery Mine Advertisement, Konami Australia Pty. Ltd., published Jan. 1999.
On the House Advertisement written by Olympic Video Gaming, published prior to 2002.
Penguin Pays Advertisement written by Aristocrat Incorporated, published in 1998.
PokerStars.com—Tournament Rules, printed from p://www.pokerstars.com/poker/toumaments/rules/, available prior to Nov. 2009. (attached).
REEL MAGIC™ Gaming Machine Description written by IGT, available in 1986.
South Park Advertisement, written by IGT, published Sep. 1999.
WagerWorks Monopoly—Here & Now—Review, printed from www.casinoadvisor.com, available prior to Nov. 2009. (attached).
Wild Bear Salmon Run Advertisement written by IGT, published in 2003.
Wild Streak Advertisement written by WMS Gaming, Inc., published in 2001.
Yahoo! Games—How Do I Start Playing, printed from help.yahoo.com, available prior to Nov. 2008. (attached).
Your Real Key to Gaming Success Advertisement (including Roll Over Beethoven and Wild Fortune) written by Olympic Video Gaming, published date unknown.

* cited by examiner

There are 68 gaming devices in 1 group of gaming devices.
500
502a
504a
506a
508a
520a
520b
Progressive Award: $1067.00
Group 1
502
504
506
508

There are 121 gaming devices in 1 group of gaming devices. The upper progressive award reconfiguration threshold has been exceeded.
Progressive Award: $2569.00

A PLAYER HAS WON THE PROGRESSIVE AWARD OF 3148! A progressive award reconfiguration event has occurred.
Progressive Award: $3148.00

GAMING SYSTEM AND METHOD FOR DYNAMICALLY GROUPING GAMING DEVICES TO PROVIDE PROGRESSIVE AWARDS

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide awards to players in primary or base games are known. Such gaming machines generally require the player to make a wager to activate or play the primary or base game. In many of these gaming machines, the award is based on the player obtaining a winning symbol or winning symbol combination and on the amount of the wager (e.g., the higher the wager, the higher the award) for the play of the primary or base game. Symbols or symbol combinations which are less likely to occur usually result in higher awards.

Gaming machines which provide secondary or bonus games are also known. Access to secondary or bonus games may depend upon a player's wagering activity. For example, a gaming machine may require a player to wager a specific amount, such as a maximum wager, or an additional wager by the player, to provide the player with access to the secondary or bonus game. Secondary or bonus games are generally activated or triggered upon an occurrence of a designated triggering event, such as upon a generation of a triggering symbol or triggering symbol combination, in the primary or base game. For instance, a bonus symbol occurring on a payline on a third reel of a three reel slot machine may trigger a secondary or bonus game. When a secondary or bonus game is triggered, the gaming machine generally indicates this triggering through one or more visual and/or audio output devices, such as the reels, lights, speakers, video screens, or other visual and/or audio output devices of the gaming machine.

Progressive awards are also known. In one form, a progressive award or progressive award pool is an award amount which includes an initial or reset amount funded by a gaming establishment and an additional or player contribution amount funded through wagers made on plays of the games of the gaming system. For example, a casino may fund the initial or reset amount by contributing a designated amount to the progressive award and the gaming system may fund an additional amount of the progressive award with player contributions by allocating a portion of each wager placed on each play of the game, such as by allocating 1.0% of each wager placed on a play of a game of one of the gaming machines, to the progressive award. In certain gaming systems, less than all wagers are used to fund the progressive award. For example, in certain gaming systems, only wagers which result in the player having an opportunity to win the progressive award are used to fund that progressive award.

Generally, a progressive award grows in value as more players wager on plays of the game and more portions of those players' wagers are allocated to fund the progressive award. When any player obtains a winning outcome associated with the progressive award (e.g., a winning symbol or winning symbol combination), such gaming systems provide the player with the progressive award and reset the progressive award to a value equal to the initial or reset amount funded by the casino. After resetting the award, subsequent wagers by the players fund the new progressive award.

A progressive award in one form is allocated to or associated with a single gaming machine. In another form, a progressive award is allocated to or associated with a plurality of gaming machines, such as a bank of gaming machines having physical proximity with one another. In some gaming systems, wherein a plurality or bank of gaming machines share or are associated with a same progressive award, the number of such sharing gaming machines is designated for a duration associated with the progressive award. For example, eight gaming machines in a bank each provide players an opportunity to win a progressive award. In some gaming systems, wherein two or more banks are associated with a same progressive award, the number of gaming machines associated with a same progressive award may vary. For example, hundreds of gaming machines at dozens of banks across a plurality of gaming establishments in a plurality of geographic regions may each provide players an opportunity to win a same progressive award. In such an implementation, a gaming establishment can add or remove gaming machines from association with the existing progressive award at any time. However, addition or removal of gaming machines in such gaming systems requires hardware and other alterations to the gaming system, and is extremely time and labor intensive.

Certain gaming systems can be implemented in a networked environment, such as over the Internet, to enable a plurality of players to each participate simultaneously in plays of the game using their own personal electronic device. For example, certain gaming systems enable a plurality of players to access those gaming systems via one or more web browsers running on one or more client computers, such as one or more desktop computers, laptop computers, tablet computers, personal digital assistants (PDAs), mobile telephones, netbooks, or other appropriate computing devices. Thus, players from different geographic locations each participate in a same game by accessing an appropriate server and providing wagers on plays of the game (e.g., by causing an electronic transfer of such wager amounts from a bank account).

Moreover, certain gaming jurisdictions impose restrictions on gaming, and particularly on gaming machines which provide players with opportunities to win progressive awards. For example, certain jurisdictions require that any progressive award which is shown to any player eventually be provided to one or more players. In some such jurisdictions, both an initial amount provided by the gaming establishment (sometimes referred to as a seed amount or a reset amount), and the portion of the progressive award funded by player wagers, must be provided to one or more players. Certain jurisdictions require that an instantaneous Return to Player ("RTP") amount, measured as a percentage, never falls below a designated threshold (e.g., 75%), and that a long-term average RTP not change for a given game unless a particular regulatory process is followed. Certain jurisdictions further require that non-qualifying wagers (e.g., wagers not of a sufficient magnitude) not be used to fund a progressive award. Certain jurisdictions also impose maximum odds limitations (e.g., the odds of winning a progressive cannot be worse than 50,000,000 to one). Finally, whether or not it is styled as a jurisdictional requirement, many gaming system operators do not provide games whose progressive award hit frequencies fall below a certain frequency (e.g., wherein a progressive award is won less than once a year).

A need exists to provide such a scalable game which enables a gaming establishment to provide a reasonably consistent gaming experience to its players while conforming to various jurisdictional requirements.

Certain players of known gaming systems want to win relatively large progressive awards even if the relatively large progressive awards hit or are won relatively infrequently. For such players, the frequent hitting of a progressive and the resetting in value of such progressive award prevents the progressive award from growing to such relatively high values. Certain other players of known gaming systems want to wager on plays of a game wherein the gaming system provides a progressive award relatively frequently. Such players experience excitement and anticipation based on the frequency at which the progressive award is hit rather than based on the magnitude of the award. These players prefer to see the progressive award hit frequently, as each hit represents another opportunity to win the progressive award regardless of the value. Accordingly, a need exists for gaming systems, gaming devices, and methods to dynamically group players to provide progressive awards to satisfy varying desired gaming experiences with respect to the progressive awards.

Known gaming systems, which typically exhibit a limited range of progressive award incrementation, a limited range of frequency of progressive award payouts, and other typical limitations, may provide a desired gaming experience when hundreds of players are participating, but may provide a less than desirable experience when only a few players are participating. Thus, a further need exists to provide a gaming system which is scalable to provide a reasonably consistent gaming experience regardless of significant changes in the quantity of players wagering on plays of the game.

SUMMARY

The present disclosure relates generally to gaming systems, gaming devices, and methods for dynamically allocating gaming devices or players to groups or collections of gaming devices which are associated with different progressive awards based on amounts of activity compared to one or more predefined allocation thresholds. More particularly, the present disclosure relates to a gaming system which maintains at least one progressive award for at least one group of gaming devices. If an amount of player activity of the group of gaming devices, such as a number of players wagering on plays of a game for the group, exceeds a first or upper progressive award reconfiguration threshold, the gaming system dynamically disassociates at least one gaming device from the group of gaming devices and associates any split or cleaved gaming devices with a different or new group of gaming devices having a different progressive award. If the amount of player activity of the group of gaming devices, such as the number of players wagering on plays of the game, falls below a second or lower progressive award reconfiguration threshold, the gaming system dynamically associates one or more gaming devices with the group of gaming devices and the progressive award of that group of gaming devices. This disassociating and associating of gaming devices from groups of gaming devices occur following a progressive award reconfiguration event, such as one of the players winning the progressive award. In one embodiment, the gaming system determines the group of gaming devices with which to associate a gaming device based upon one or more characteristics of one of the players or one of the gaming devices. In another such embodiment, if an amount of player activity falls outside a range of desired player activity, the gaming system determines a progressive award initial amount (sometimes referred to as a seed amount or a reset amount) based on one or more desired player experience with respect to that progressive award.

In one embodiment, the disclosed gaming system monitors an amount of player activity at a group of gaming devices, the group of gaming devices being associated with a progressive award or other type of equity buildup. If an amount of player activity at the group of gaming devices (such as a quantity of players wagering on plays of a game) exceeds an upper progressive award reconfiguration threshold (such as by additional players beginning to wager on plays of games of gaming devices of the group), the gaming system dynamically disassociates or cleaves at least one gaming device from the group of gaming devices. In one embodiment, the gaming system dynamically disassociates or cleaves at least one gaming device by creating a new group of gaming devices associated with a different progressive award and assigning any disassociated or cleaved gaming device(s) to the new group. In another embodiment, the gaming system dynamically disassociates or cleaves any gaming devices by assigning such disassociated gaming devices to an existing group having an amount of player activity that is currently below the upper progressive award reconfiguration threshold.

In one embodiment, if the gaming system determines that player activity at a group of gaming devices has fallen below a lower progressive award reconfiguration threshold, the gaming system associates gaming devices with that group until the player activity of the group exceeds the lower progressive award reconfiguration threshold. For example, if enough players cease wagering on plays of the game such that the player activity for the group of gaming devices falls below the lower progressive award reconfiguration threshold, the gaming system dynamically associates at least one new gaming device with the group. The gaming system dynamically associates gaming devices by associating at least one gaming device from a different group of gaming devices with the group of gaming devices whose current player activity is below the lower progressive award reconfiguration threshold. Alternatively, the gaming system dynamically associates gaming devices with the group of gaming devices by assigning new gaming devices (i.e., those gaming devices at which players are just beginning to wager on plays of a game) to the group whose player activity is below the lower progressive award reconfiguration threshold. In one embodiment, if the player activity is below the lower progressive award reconfiguration threshold, the gaming device dynamically deactivates that group of gaming devices and associates each gaming device of the deactivated group with another, active group.

In one embodiment, the gaming system performs any association or disassociation of gaming devices after a progressive award reconfiguration event has occurred for a group of gaming devices. In one embodiment, the progressive award reconfiguration event includes one of the players at a group of gaming devices winning the progressive award. Thus, the dynamic associating or disassociating of gaming devices coincides with a resetting of the progressive award associated with a group of gaming devices. In another embodiment, the progressive award reconfiguration event occurs when another, non-progressive award is won by a player at one of a group of gaming devices.

The gaming system disclosed herein can be implemented in a networked environment, such as over the Internet. In an Internet embodiment, the gaming system disclosed herein is implemented using one or more servers, and individual users wagering on plays of the game access the servers (and play the game) by logging on from a personal web browser. In such networked embodiments, that a quantity of gaming devices associated with a single group of gaming devices changes as additional players begin to wager or cease wagering on plays of the game. That is, while in a physical gaming establishment, the number of gaming devices in a single bank of gaming devices may not change, a networked environment is not so limited. Thus, in the networked environment, the determination as to whether a threshold amount of gaming activity has been reached is based, in part, on a quantity of gaming devices currently contained in one or more groups of gaming devices.

By disassociating and associating gaming devices as described above, the gaming system maintains a desired gaming experience for a plurality of players. For example, by ensuring that each progressive award is being wagered on by a number of gaming devices from a desired range of gaming devices (i.e., a number of gaming devices between the upper progressive award reconfiguration threshold and the lower progressive award reconfiguration threshold), the gaming system dynamically and automatically maintains a experience within a desired range for its players.

In one embodiment, the disclosed gaming system also maintains a desired game play experience with respect to the progressive award of a group of gaming devices by altering one or more parameters (or the ranges associated with such parameters) associated with a progressive award, such as (i) the initial or reset amount of the progressive award, (ii) the progressive award growth rate associated with the progressive award, and (iii) the probability of winning the progressive award. In one embodiment, the gaming system adjusts the rate of progressive award growth to maintain a gaming experience within a desired range. For example, the progressive award growth rate is directly based on a percentage of eligible player wagers. In another example, the progressive award growth rate is based on a percentage of each wager by a player on a play of the game. Alternatively, the progressive award growth rate is determined independent of one or more player wagers.

In one embodiment, the gaming system alters the progressive award initial or reset amount by increasing the progressive award reset amount immediately following an occurrence of a progressive award reconfiguration event if the amount of player activity exceeds the upper progressive award reconfiguration threshold. In a further embodiment, the gaming system reduces the probability of winning the progressive award while concurrently increasing the initial or progressive award reset amount. The gaming system calculates the increase in progressive award reset amount and/or corresponding decrease in probability so as to maintain a constant average expected payout for the group of gaming devices which is returned to one of the players of the gaming system (i.e., in the form of a progressive award provided to one of the players). In a further embodiment, the gaming system initially increases the progressive award reset amount to an intermediate progressive award reset amount after a first reset of the progressive award, and thereafter increases the intermediate progressive award reset amount to the desired (i.e., calculated) progressive award reset amount after a second reset of the progressive award. In this embodiment, by incrementally increasing the progressive award reset amount (and incrementally decreasing the probability of winning the progressive award), the disclosed gaming system provides a reasonably consistent game play experience to the players.

It should be appreciated that in one embodiment the gaming system selects the desired progressive award parameter or parameters based on an aspect of the players' game play experiences with respect to progressive awards, such as a players preference for more frequently won progressive awards and/or a player's preference for larger progressive awards. For example, the gaming system calculates a desired probability which is higher than the current probability, and a corresponding reset amount which is lower than the current reset amount. Alternatively, the gaming system selects a progressive award increase rate that is lower than a previous progressive award increase rate, depending on the type of gaming experience a gaming establishment decides to offer to its players.

In one embodiment, the gaming system provides that an overall return to player ("RTP") amount for a particular game remains constant or substantially constant (i.e., within a designated range of RTP amounts) during a plurality of plays of a game. The gaming system maintains this RTP amount by maintaining an amount contributed to the progressive award by each player's wagers on plays of the game. Alternatively, the gaming system causes one or more contribution amounts by one or more wagers on the plays of the game, but maintains the overall RTP by altering game parameters such as parameters for a secondary bonus, a community bonus, a game station-specific bonus, a game paytable change, an award frequency, and/or any other suitable parameter that affects the overall RTP.

In certain embodiments, the gaming system disclosed herein enables players to wager on plays of the game to win various kinds of awards. As noted, the gaming system enables players to wager on plays of a game in an effort to win progressive awards. In one embodiment, an award winnable by a player (such as a progressive award) is funded in part by a source other than player wagers. For example, a progressive award is funded by a casino marketing fund or another marketing entity. In other embodiments, the gaming system enables players to wager on plays of the game to win other types of equity build-up, such as enhancements to potential future wins (e.g., larger award multipliers, greater numbers of bonus opportunities, additional award or bonus triggering opportunities), or other suitable types of equity build-up.

The disclosed gaming system enables a player at a gaming device which is joining the gaming system to select a group of gaming devices from amongst a subset of a plurality of groups of gaming devices associated with a plurality of progressive awards. For example, the gaming system determines the subset of the groups of gaming devices based on the player's desired game play experience with respect to the progressive award, such as the players' preferences for more frequently won progressive awards and/or the players' preferences for larger progressive awards, when compared with one or more progressive award reconfiguration thresholds. In one embodiment, the gaming system determines the subset of groups of gaming devices based on the group's status with respect to the upper and lower progressive award reconfiguration thresholds.

In one embodiment, the gaming system determines the subset of groups from which the player can choose based on a characteristic of the player, such as the player's status as determined by a player tracking system. For example, if a player is associated with a gaming status such as a VIP status, a platinum status, a gold status, or a silver status, the subset of groups of gaming devices from which the player could choose is altered accordingly. In this example, a player with a VIP status is given the option to join a group of gaming devices associated with a relatively high progressive award, while a player with a silver status is given the opportunity to join a group of gaming devices with a relatively lower progressive award. Alternatively, which subset of groups are available to a player is based on one or more of the player's average wager size, an account balance of the player, a player's buy-in amount, the player's longevity (i.e., the amount of time the player has had an account), an affiliation of the player (e.g., with a particular website or gaming establishment), a player's win history, or other suitable characteristics of the player.

It is an advantage of the present disclosure to provide a gaming system which provides groups of gaming devices associated with progressive awards to maintain a player's desired gaming experience within a range despite other gaming devices joining or leaving the gaming system. It is a further advantage of the present disclosure to enable a player to select from a subset of groups based on the player's desired game play experience and based on the variable quantity of players wagering on the plurality of groups of the gaming system.

Additional features and advantages are described in, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
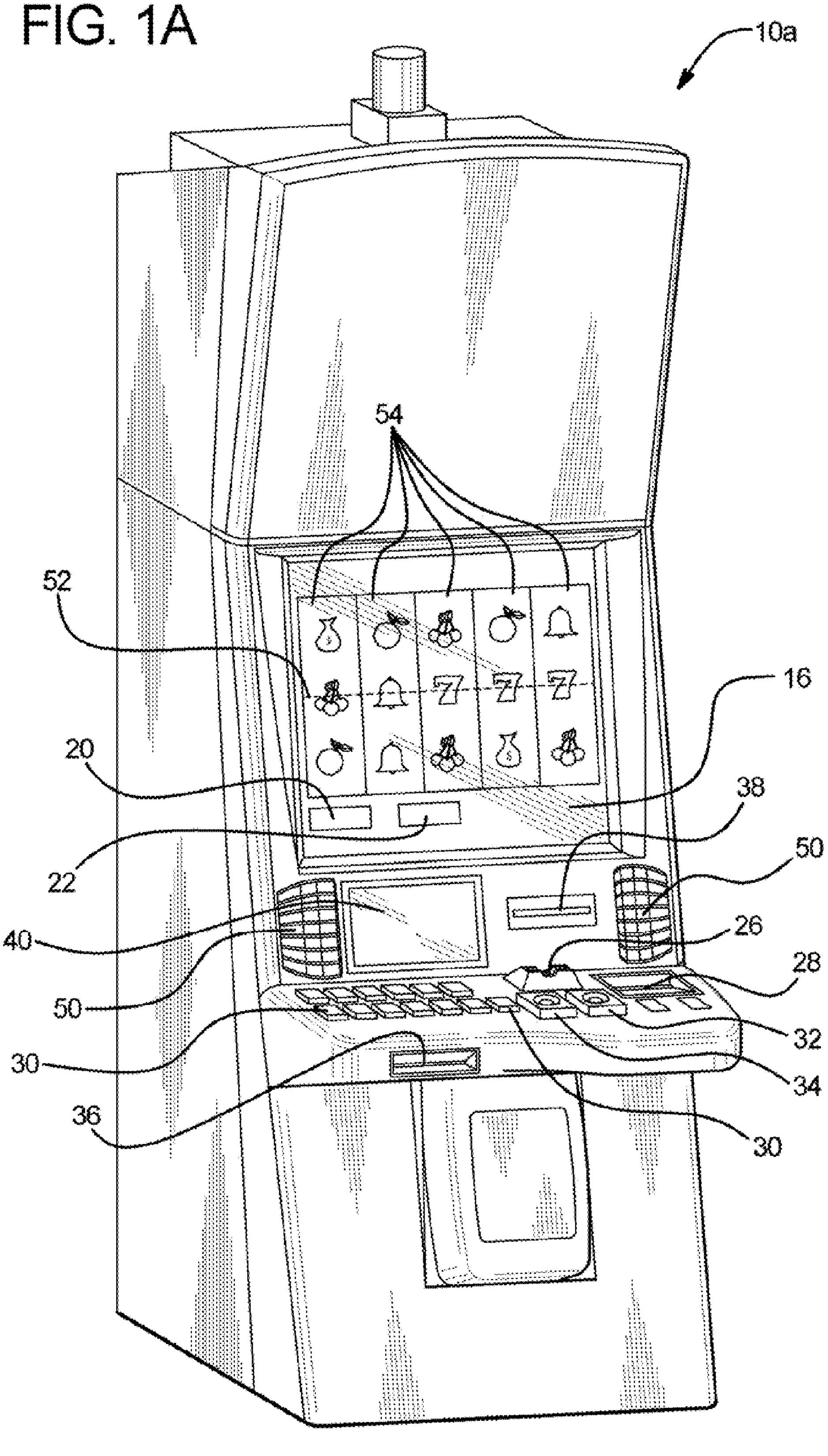
FIGS. 1A and 1B are perspective views of example alternative embodiments of the gaming device of the present disclosure.
Figure 1B:
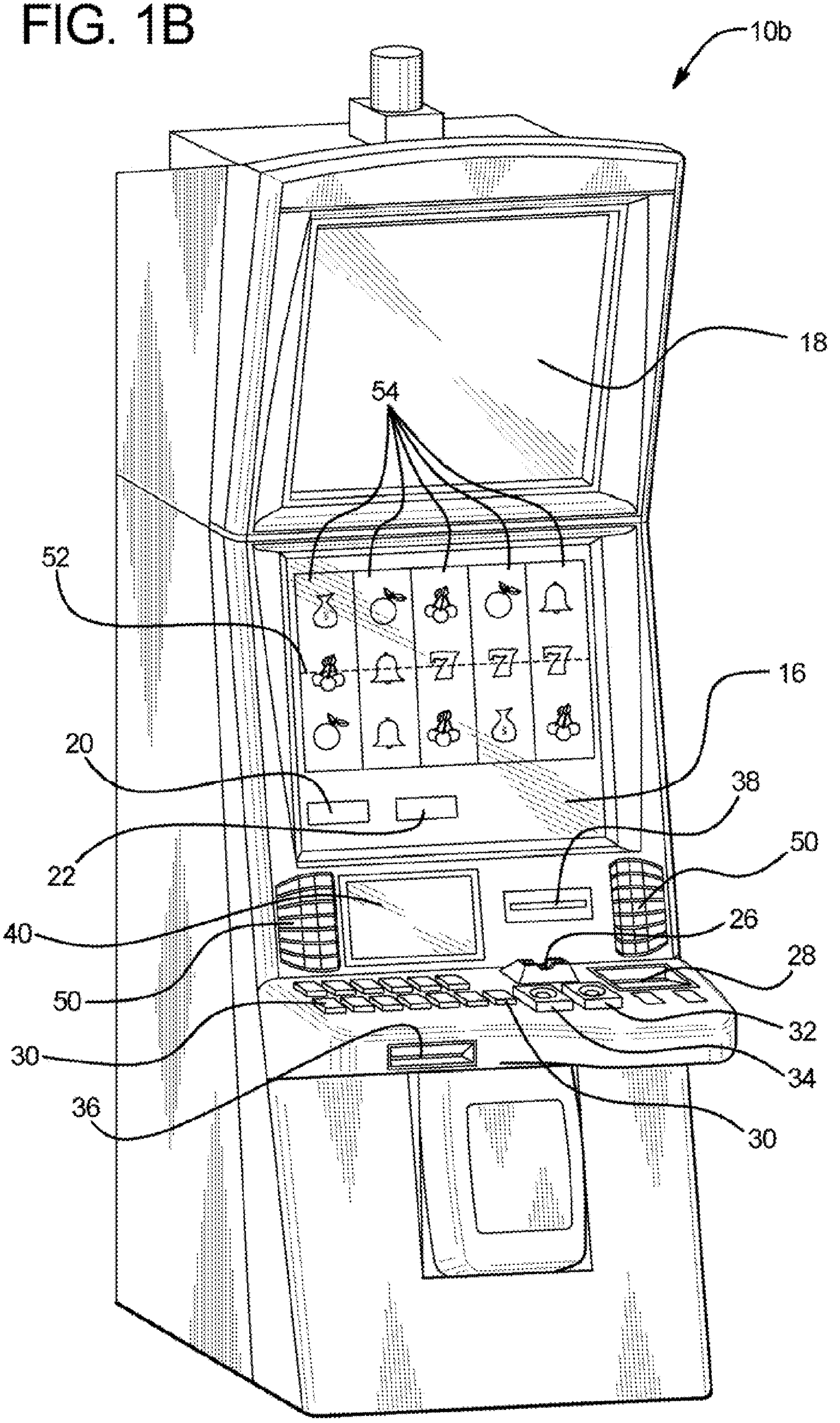

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
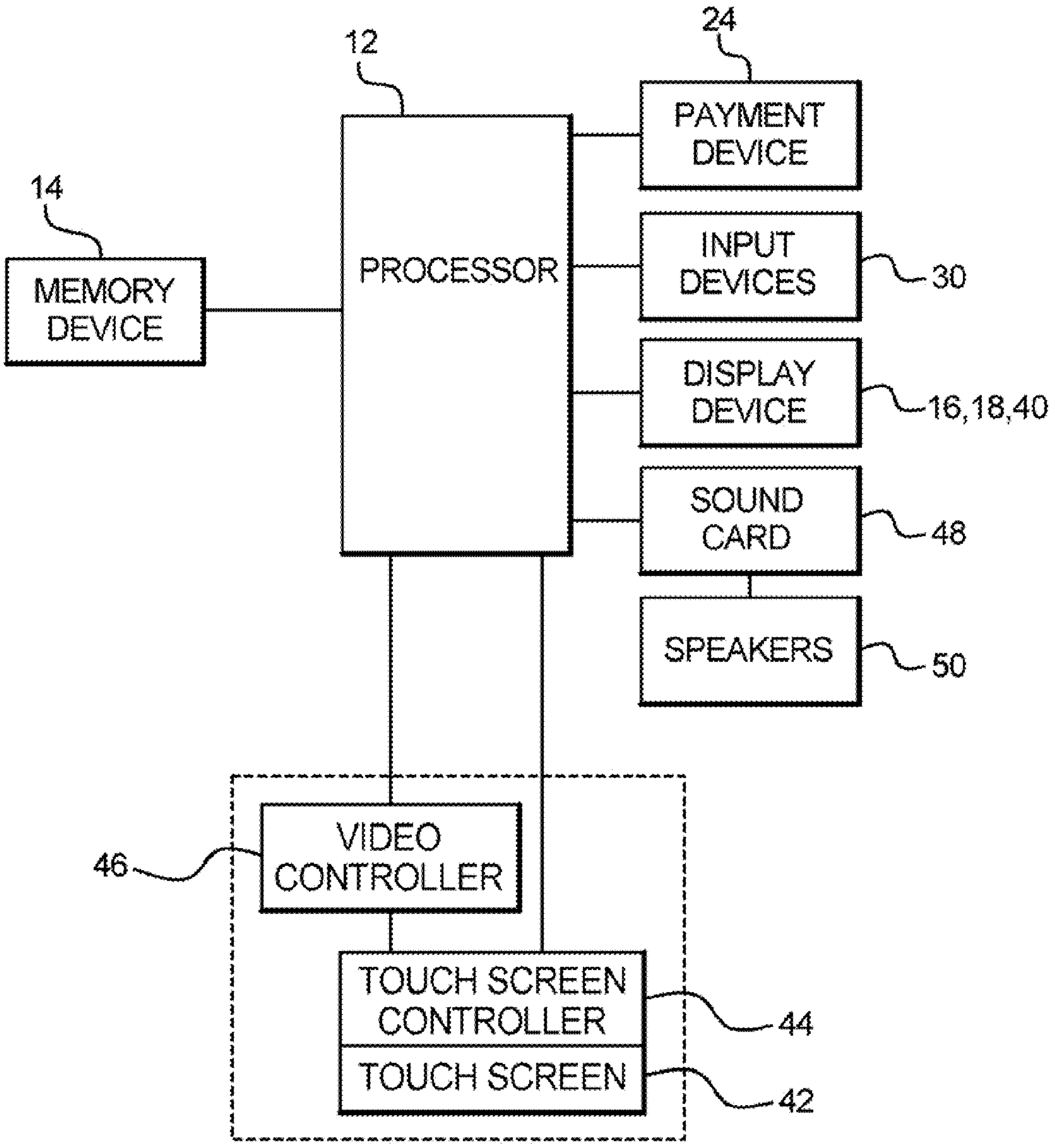
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to enable player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, a base or primary game may be a video scratch card game in which the gaming device displays a plurality of selectable indicia on at least one of the display devices. In this embodiment, the gaming device enables the player to select at least one of the selectable indicia via an input device such as a touch screen. In one such embodiment, for each player selection of one of the indicia, the gaming device reveals an award. In another embodiment, for each player selection of one of the indicia, the gaming device reveals a number or a symbol. If that revealed number or symbol matches a pre-determined number or symbol, the gaming device provides an associated award to the player. In various embodiments, the associated award is pre-determined or determined and/or revealed based on another indicia. In another such embodiment, the gaming device enables the player to select at least one indicia of one or more primary set of indicia and select at least one indicia of one or more secondary set of indicia. For each player selection of an indicia of the primary set of indicia and each player selection of an indicia of the secondary set of indicia, the gaming device reveals a number or a symbol. If the gaming device reveals a number or symbol of the primary set of indicia that matches a number or symbol of the secondary set of indicia, the gaming device provides a player with an award. In various embodiments, the associated award is pre-determined or determined and/or revealed based on another indicia.

In another embodiment of a video scratch card game, for each player selection of one of the indicia, the gaming device reveals award values, symbols, or numbers. If the gaming device reveals two or more matching award values, numbers or symbols, the gaming device provides an award to the player. In one embodiment, the gaming device provides an award equal to the matching values. In another embodiment, the gaming device provides an award that is pre-determined or determined and/or revealed based on another indicia. In another embodiment of a video scratch card game, if the player selects one of the indicia, the gaming system reveals numbers of moves on a trail or board. The locations on these trails or boards are associated with winning or losing indicia. Landing on a winning indicia provides the player with the displayed award. It should be appreciated that in various embodiments of a video scratch card game, the gaming system provides an award that is a bonus game, a progressive award, or an opportunity to play for one or more progressive awards as described herein.

In another embodiment, a base or primary game is a video roulette game including a modified standard American single zero or double zero roulette wheel. In one embodiment, at least one of the standard wells in which a ball may land (such as zero, double zero, or any other number) is replaced with one or more bonus wells. In these embodiments, if the ball lands in one of the bonus wells, the gaming device provides a bonus event or an opportunity to win one or more progressive awards. In one embodiment, the gaming device requires an additional wager to be placed to provide the bonus event or an opportunity to win one or more of the progressive awards as described herein. In various embodiments, the gaming device includes one or more bonus wells which have a size that is different from the size of the standard wells. In various embodiments, the probability of the ball landing in these bonus wells is different from the probability of the ball landing in the standard wells.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
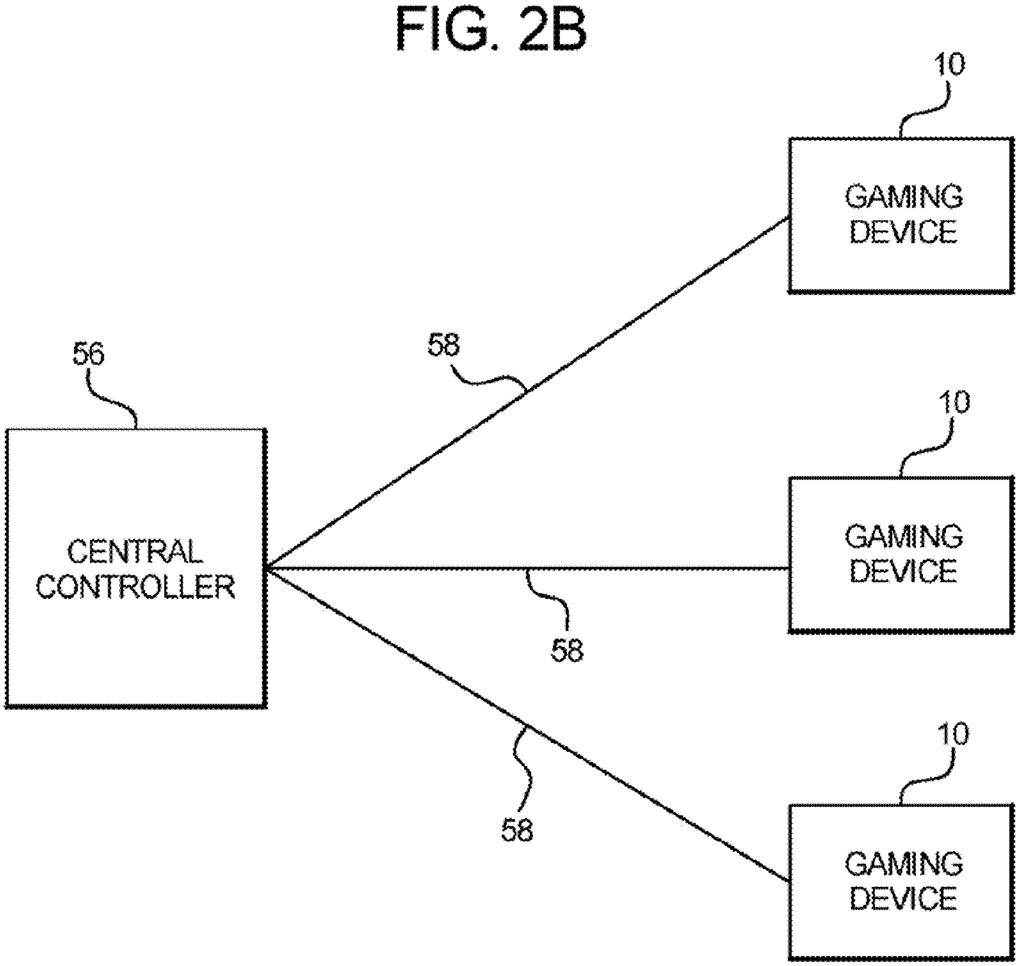
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an Internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or designated on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In one embodiment, a plurality of gaming devices at one or more gaming sites are networked to the central server in a progressive configuration, as known in the art, wherein a portion of each wager provided to initiate a base or primary game is allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive awards. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player places a side bet or side wager to be eligible to win the progressive award associated with the side bet. In one embodiment, the gaming system requires the player to place the maximum bet and the side bet to be eligible to win one of the progressive awards. In another embodiment, if the player places the required wager or side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed. In some variations, only wagers the qualify for the opportunity to win progressive award are used for funding the progressive. In other variations, ever wager is used for funding the progressive irrespective of whether or not a given wager qualifies for the opportunity to win the progressive.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

Gaming System for Dynamically Allocating Groups of Gaming Devices

The gaming system disclosed herein is configured to dynamically alter or reconfigure groups of gaming devices based on player activity, such as a quantity of players wagering on plays of a game, to provide players with gaming experience that is within a desired range of gaming experiences (such as a reasonably consistent hit frequency) with respect to a progressive award. The gaming system maintains at least one group of gaming devices, and enables players to wager on plays of a game at a plurality of gaming devices of the group. The gaming system tracks player activity with respect to the group of gaming devices, such as by tracking the quantity of players wagering at gaming devices of the group. In one embodiment, the gaming system dynamically reconfigures the group of gaming devices based on an occurrence of a progressive award reconfiguration event and based on an amount of player activity at the group compared with at least one progressive award reconfiguration threshold. If the player activity for the group of gaming devices (such as the quantity of gaming devices of the group) exceeds an upper progressive award reconfiguration threshold, the gaming system dynamically disassociates at least one gaming device from the group of gaming devices, reducing the overall quantity of gaming devices of that group. If the player activity for the group of gaming devices (such as the quantity of gaming devices of the group) falls below a lower progressive award reconfiguration threshold, the gaming system dynamically associates at least one gaming device with the group of gaming devices, increasing the quantity of gaming devices associated with that group. This dynamically associated gaming device can be a gaming device at which a player has just started wagering, or a gaming device that was previously associated with a different group of gaming devices.

The disclosed gaming system can advantageously be implemented in multiple configurations, such as a configuration including a plurality of physical gaming devices in one or more gaming establishments, or a networked configuration in which players place wagers on plays of the game from personal electronic devices, such as personal computers, personal digital assistants (PDAs), mobile telephones, or other appropriate personal electronics.

When the disclosed gaming system is implemented in a configuration including a plurality of physical gaming devices, such as a plurality of gaming devices in a physical gaming establishment, the number of gaming devices of the gaming system does not fluctuate in the short term. That is, since the addition or removal of gaming devices from the gaming system requires infrastructure changes, the gaming system maintains a relatively consistent quantity of gaming devices.

The gaming system disclosed herein is also implementable as a plurality of physical gaming devices in a plurality of gaming establishments that are linked by or communicate via a network. In this embodiment, the number of gaming devices of the gaming system fluctuates more easily, as additional banks of gaming devices can be added by connecting those gaming devices to an appropriate network. Thus, in an embodiment wherein a plurality of groups of gaming devices of the gaming system span a plurality of gaming establishments, the disclosed system ensures that players have desired experience regardless of the quantity of gaming devices contained in the gaming system, and regardless of a number of players currently wagering on plays of the games of the gaming devices.

When the disclosed gaming system is implemented in a networked environment, such as over the Internet, such that players wager on plays of the game from their own personal electronic devices, the gaming system includes at least one server configured to co-act with a plurality remote processors of the personal electronic devices, thus enabling players to wager on plays of the game remotely. It should be appreciated that when the gaming system is implemented in such a networked context, the quantity of gaming devices of the gaming system disclosed herein can increase and decrease very rapidly. That is, as players log on or otherwise join the server, the number of gaming devices of the gaming system can fluctuate in the short term.

In one embodiment, the gaming system disclosed herein is implemented in a server-based terrestrial environment. That is, in a physical gaming establishment, a plurality of gaming devices are each connected to or in communication with a server. In one embodiment, the server enables a user wagering on plays of the game at each gaming device to select one from among a plurality of different games to play. For example, a slot machine may enable a player to select from two different slot games, and to thereafter wager on plays of the selected game. In one embodiment, at least one of the games which such a server-based system enables to wager on is associated with a progressive award. For plays of such a game, the player can potentially win the progressive award. In one embodiment, the server is implemented according to the instant disclosure to provide such a game. That is, the server dynamically associates and disassociates gaming devices from groups of gaming devices, such that a gaming experience which is in a desired range of gaming experience is provided to the players. It should thus be appreciated that in a gaming establishment or other physical configuration of gaming devices, the disclosed gaming system enables the gaming devices to be dynamically associated with and disassociated from appropriate groups to facilitate the advantages discussed herein.

As used herein, the term “gaming device” refers to any device which enables a player to wager on plays of the game. That is, a gaming device can be a physical gaming machine in a gaming establishment, such as a slot machine in a casino (whether or not implemented in the server-based environment discussed above), or can be a processor such as a microprocessor of a laptop computer, desktop computer, PDA, tablet computer, mobile phone, or other personal electronic device that is running a web browser or other software to enable remote wagering on plays of a game. In some embodiments, a gaming device is provided via a client-server architecture wherein each player interacts with a single server or interacts with a network of servers using their own client device. Thus, the term “gaming device” should be understood in its broad sense and should not be viewed as limiting the disclosed gaming system to a particular embodiment or format.

Figure 3:
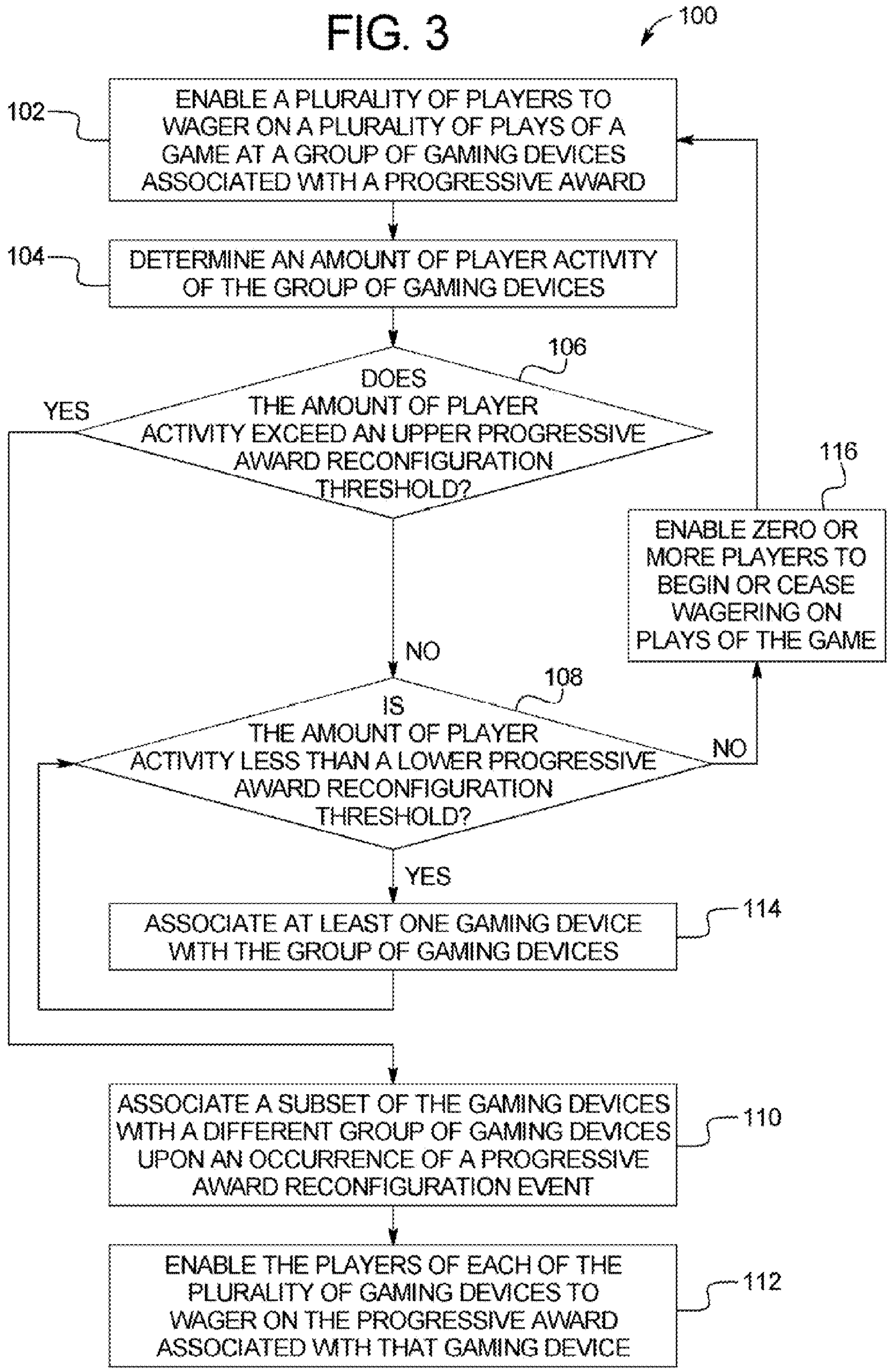
FIG. 3 is a flow chart of an example process for operating a gaming system which dynamically adds and removes gaming devices from a group of gaming devices as disclosed herein

FIG. 3 illustrates a flow chart of an example process 100 for operating a gaming system that dynamically associates and/or disassociates gaming devices from groups of gaming devices as disclosed herein. Although the example process 100 for operating the gaming system is described with reference to the flow chart illustrated in FIG. 3, many other methods of operating a gaming system are contemplated. For example, the order of certain of the blocks may be changed, and certain of the blocks described are optional.

In the embodiment illustrated in FIG. 3, the gaming system enables a plurality of players to wager on a plurality of plays of games provided by a group of gaming devices, as indicated by block 102. For example, the gaming system enables a plurality of players, each accessing the gaming system with one or more Internet-enabled devices such as personal computers, to wager on plays of the game remotely via the Internet. In this example, the group of gaming devices includes a plurality of networked devices which each enable a player to remotely wager on plays of a game.

Each of the plurality of gaming devices of the group of gaming devices is associated with a progressive award, as indicated by block 102. That is, the player wagering at each gaming device of the group is eligible to win a progressive award associated with that group. The gaming system provides the progressive award to one of the players upon an occurrence of an event associated with the progressive award, such as a generation of a designated game outcome.

Referring still to FIG. 3, the gaming system determines a current amount of player activity for the group of gaming devices, as indicated by block 104. For example, the gaming system determines the amount of player activity based on a quantity of players wagering on plays of the game. Alternatively, the gaming system determines the amount of player activity based, at least in part, on the rate at which players are wagering, the amounts of the players' wagers on plays of the games, information about the players such as information stored in an appropriate player tracking system, or any other suitable indicator of player activity.

After determining the amount of player activity, the gaming system compares the determined amount of player activity for the group of gaming devices to an upper progressive award reconfiguration threshold, as indicated by decision diamond 106. The upper progressive award reconfiguration threshold represents an upper level or amount of player activity enabled by for a group of gaming devices. For example, the upper progressive award reconfiguration threshold represents an amount of activity which provides the players with a gaming experience from within a desired range of gaming experiences with respect to the progressive award, such as a desired rate of one of the players winning the progressive award or a desired average value achieved by a progressive award prior to one of the players winning the award. Alternatively, the upper progressive award reconfiguration threshold represents a maximum rate of players wagering on plays of a game which is desired by an operator of the gaming system for a single group of gaming devices.

If the amount of player activity for the group of gaming devices does not exceed the upper progressive award reconfiguration threshold, as indicated by decision diamond 106, the gaming system determines whether the amount of player activity is less than a lower progressive award reconfiguration threshold, as indicated by decision diamond 108. The lower progressive award reconfiguration threshold represents a lower boundary of player activity for a group of gaming devices. For example, the lower progressive award reconfiguration threshold represents a minimum amount of player activity which causes the gaming system to provide players with a desired gaming experience with respect to the progressive award, such as a desired range of rates of one of the players winning the progressive award or a desired range of average values achieved by the progressive awards prior to one of the players winning the progressive award. Alternatively, the lower progressive award reconfiguration threshold represents a minimum amount of wagering activity which is acceptable to an operator of the gaming system for a single group of gaming devices.

If the player activity exceeds the upper progressive award reconfiguration threshold, as indicated by decision diamond 106, the gaming system dynamically associates or allocates a subset of the gaming devices from the group of gaming devices with a different group of gaming devices, as indicated by block 110. This association of the subset of the gaming devices can also include associating the subset of gaming devices with the different progressive award of the different group of gaming devices, as indicated by block 110. In one embodiment, the different group of gaming devices is a newly created group of gaming devices. In another embodiment, the different group of gaming devices is a previously existing group of gaming devices, such as the existing group of gaming devices with a lowest current progressive award value. In one embodiment, the gaming system automatically associates the subset of the gaming devices with the different group. In one embodiment, the gaming system associates some of the subset of gaming devices with a first different group of gaming devices and some of the subset of gaming devices with a second different group of gaming devices. In another embodiment, the gaming system enables at least one player to select which of a plurality of different groups to join upon the occurrence of the progressive award reconfiguration event.

After associating the subset of the group of gaming devices with a different group, the gaming system enables the players at each of the gaming devices to wager on plays of a game to try to win the progressive award associated with that player's current group of gaming devices, as indicated by block 112.

If the gaming system determines that the player activity of a group of gaming devices is less than the lower progressive award reconfiguration threshold, as indicated by decision diamond 108, the gaming system dynamically associates at least one gaming device not currently associated with the group of gaming devices with the group of gaming devices whose amount of player activity is below the lower progressive award reconfiguration threshold, as indicated by block 114. For example, the gaming system dynamically associates at least one gaming device by automatically associating a gaming device currently associated with a different group of gaming devices with the group of gaming devices for which the player activity is below the lower progressive award reconfiguration threshold. Alternatively, the gaming system dynamically adds at least one gaming device to the group of gaming devices by associating one or more new gaming devices, such as a gaming device at which a player has just begun wagering on plays of the game, with the group. Alternatively or additionally, the gaming system enables a player at a gaming device not currently associated with the group of gaming devices to voluntarily join the group of gaming devices.

If the player activity does not exceed the upper progressive award reconfiguration threshold, as indicated by decision diamond 106, and is not less than the lower progressive award reconfiguration threshold, as indicated by decision diamond 108 (i.e., if the amount of player activity falls within an acceptable range of player activity), the gaming system enables zero or more players to join or cease wagering on plays of the game of the group of gaming devices, as indicated by block 116. That is, the gaming system enables players to wager on plays of the games of the plurality of gaming devices without reconfiguring the group of gaming devices so long as the amount of player activity is between the upper and lower progressive award reconfiguration thresholds. Thus, the upper and lower progressive award reconfiguration thresholds define a range of progressive award reconfiguration award thresholds, and the gaming system is configured not to reconfigure the progressive award if the amount of player activity falls within the range of progressive award reconfiguration thresholds. While the amount of player activity remains within the range of progressive award reconfiguration thresholds, the disclosed gaming system enables the players wagering on plays of the games of the group of gaming devices to continue such wagering on the then-existing progressive award, as indicated by block 102. It should be appreciated that if the player activity falls between the upper and lower progressive award reconfiguration threshold, the gaming system in one embodiment is providing a gaming experience within a desired range of experiences to the players with respect to the progressive award, and thus does not detect a need to modify the progressive award or the group of gaming devices.

It should be appreciated that the disclosed gaming system may repeat the process 100 illustrated in FIG. 3 a plurality of times for each of a plurality of groups of gaming devices, including any newly created groups of gaming devices. Thus, the gaming system disclosed herein advantageously tracks or monitors the player activity at each group of gaming devices, insuring that the amount of activity remains between the upper and lower progressive award reconfiguration thresholds even as the number of groups of gaming devices changes over time. It should be appreciated that by repeating the process 100, and by dynamically associating and/or disassociating gaming devices from the groups of gaming devices associated with progressive awards, the gaming system provides a set of groups of gaming devices such that the quantity of different groups of gaming devices grows or shrinks based on the amount of player activity (such as the quantity of players wagering on plays of the game) and maintains a desired game play experience with respect to the progressive award throughout such growth and shrinking.

In certain embodiments, such as the embodiment illustrated in FIG. 3, the disclosed gaming system performs association and/or disassociation of gaming devices from groups of gaming devices only upon an occurrence of a progressive award reconfiguration event. The progressive award reconfiguration event occurs when a player of one of the gaming devices of the group wins the progressive award associated with that group of gaming devices. In one embodiment, the progressive award reconfiguration event occurs when the progressive award is increased. That is, if a progressive award only increases upon an occurrence of an appropriate triggering event, the increase of the progressive award in one embodiment represents the progressive award reconfiguration event. In alternative embodiments, the progressive award reconfiguration event is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one such embodiment, upon the occurrence of a progressive award reconfiguration event including one of the players winning the progressive award of a group of gaming devices, the gaming system resets the progressive award of that group and compares the current player activity at the group of gaming devices to the upper and lower progressive award reconfiguration thresholds as discussed above. The gaming system determines whether to disassociate or cleave one or more gaming devices from the group of gaming devices (and associated progressive award), whether to associate or add one or more gaming devices to the group of gaming devices, or whether to not modify the group of gaming devices (and associated progressive award) simultaneously with or immediately preceding or following resetting the progressive award for the group of gaming devices. That is, a player at the group of gaming devices experience the disassociating or cleaving immediately following the winning of the progressive award. Alternatively, the gaming system is configured to determine whether the player activity is less than the lower progressive award reconfiguration threshold prior to any of the players winning a particular instance of the progressive award, and to re-associate one or more additional gaming devices of one or more groups prior to any player winning the progressive award.

Figure 4:
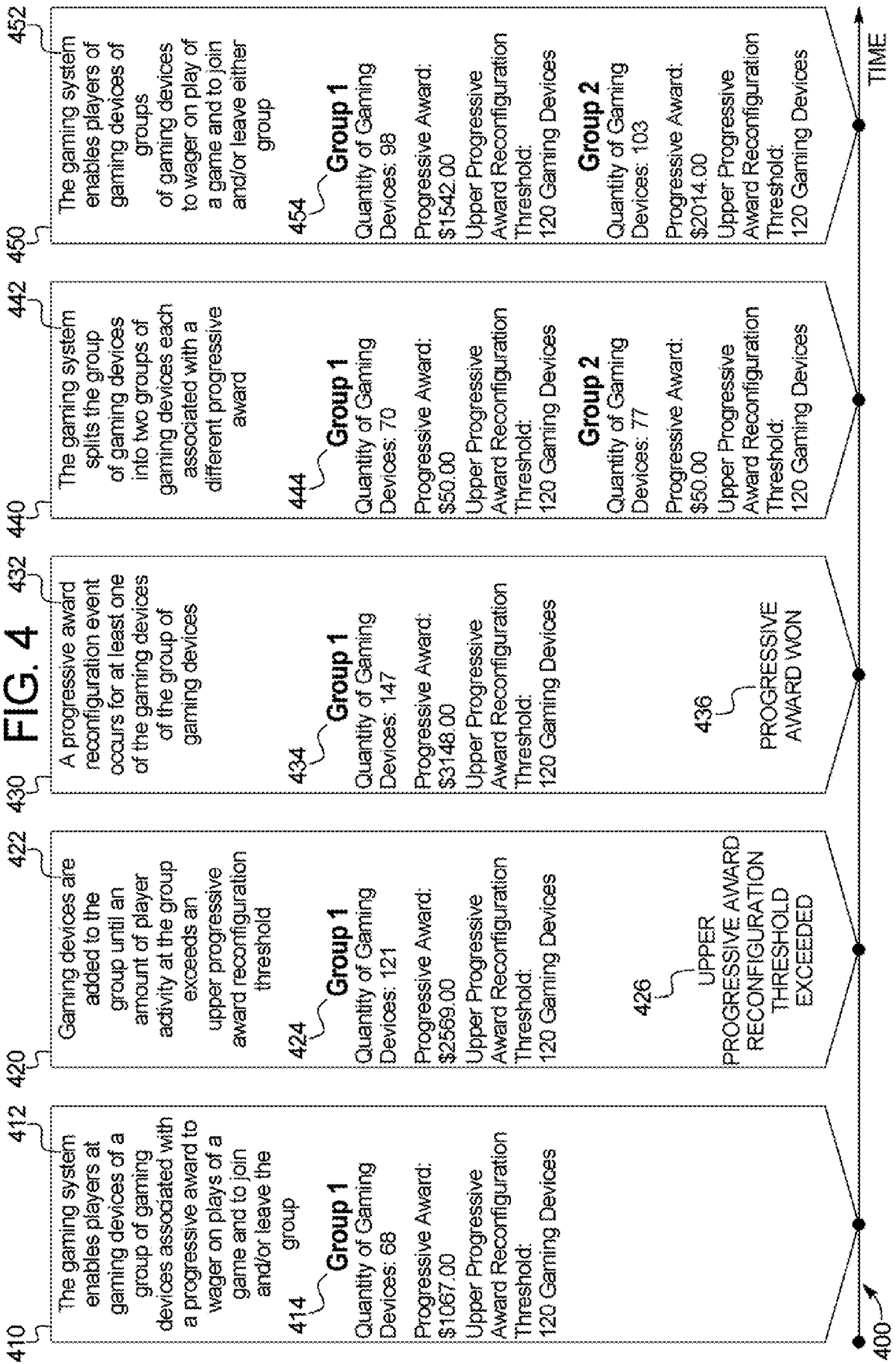
FIG. 4 is a timeline of an example period of operation of the gaming system disclosed herein.

FIG. 4 illustrates a timeline 400 of an example period of operation of the gaming system disclosed herein. Specifically, FIG. 4 illustrates a timeline 400 illustrating five distinct points in time 410, 420, 430, 440, and 450 during which the amount of player activity of the disclosed gaming system is increasing. In the illustrated embodiment, the increase in player activity is caused by additional players beginning to wager on plays of games of additional gaming devices. Timeline 400 includes an explanation section 412, 422, 432, 442, or 452 summarizing the activity which has occurred prior to those points in time 410, 420, 430, 440, and 450, respectively, and a group summary section 414, 424, 434, 444, or 454 summarizing the state of the groups of the gaming system at points in time 410, 420, 430, 440, and 450, respectively.

FIGS. 5A, 5B, 5C, 5D, and 5E each illustrate schematic representations of the gaming system disclosed herein including a community display 500 which summarizes the state of the gaming system. In one embodiment, the gaming system does not include a physical community display 500. In this embodiment, the community display 500 of FIGS. 5A, 5B, 5C, 5D, and 5E is merely illustrative and provides a summary of the status of the gaming system. Moreover, FIGS. 5A, 5B, 5C, 5D, and 5E each illustrate the plurality of gaming devices of the gaming system. Specifically, FIGS. 5A, 5B, 5C, 5D, and 5E illustrate gaming devices of the gaming system including gaming devices 502, 504, 506, and 508. Ellipses 520*a* and 520*b* indicate that gaming devices 502, 504, 506, and 508 are a subset of the total quantity of gaming devices in the gaming system.

Each illustrated gaming device 502, 504, 506, and 508 includes a progressive award display area 502*a*, 504*a*, 506*a*, or 508*a* respectively, which indicates the current progressive award value for each gaming device. Each gaming device further indicates the group of gaming devices to which that gaming device currently belongs.

Figures 5A, 5B, 5C:
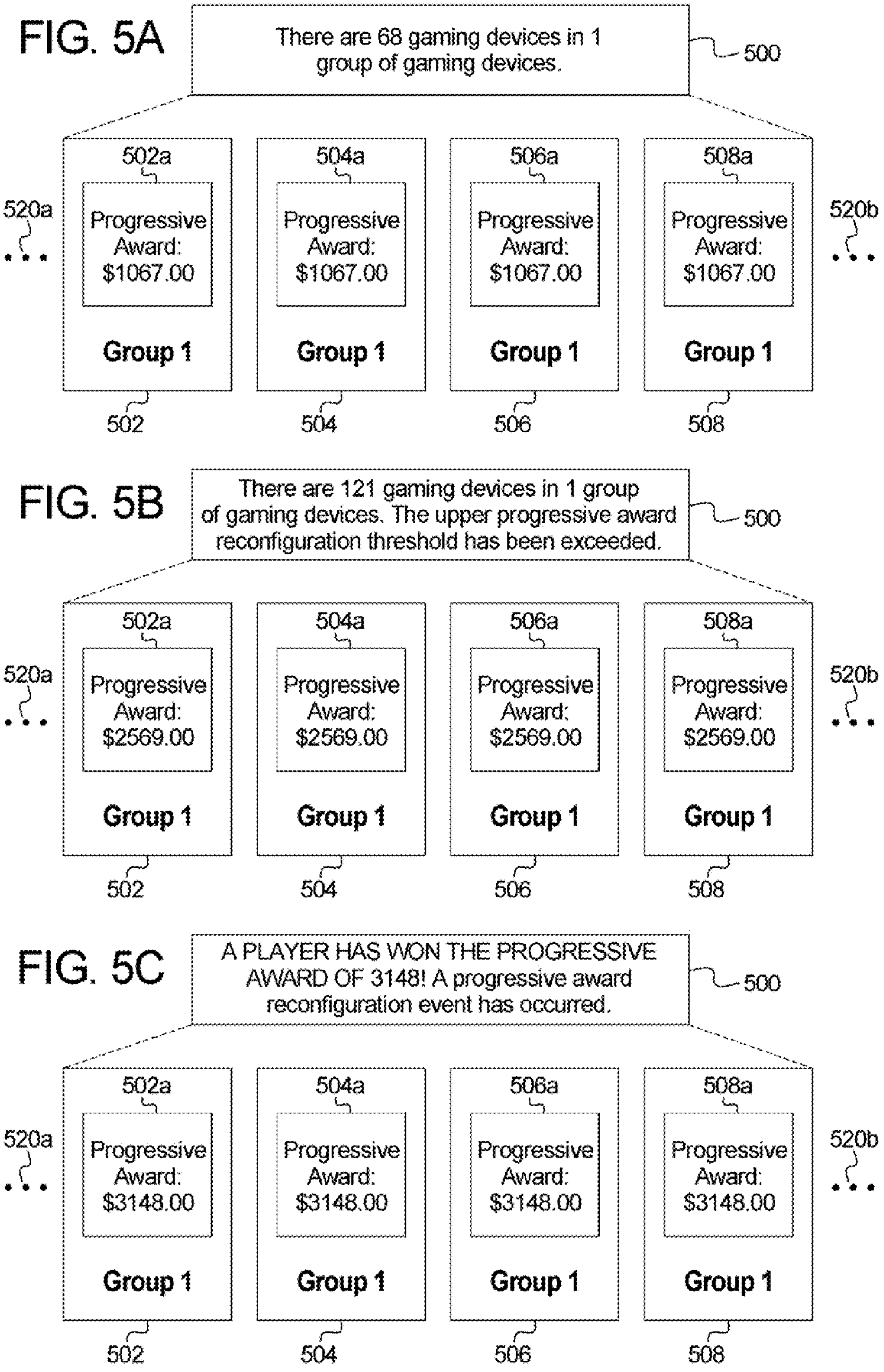
FIGS. 5A, 5B, 5C, 5D, and 5E are each schematic representations of the gaming system disclosed herein at one of a plurality of points in time including a schematic representation of the plurality of gaming devices of the gaming system.
Figure 5D:
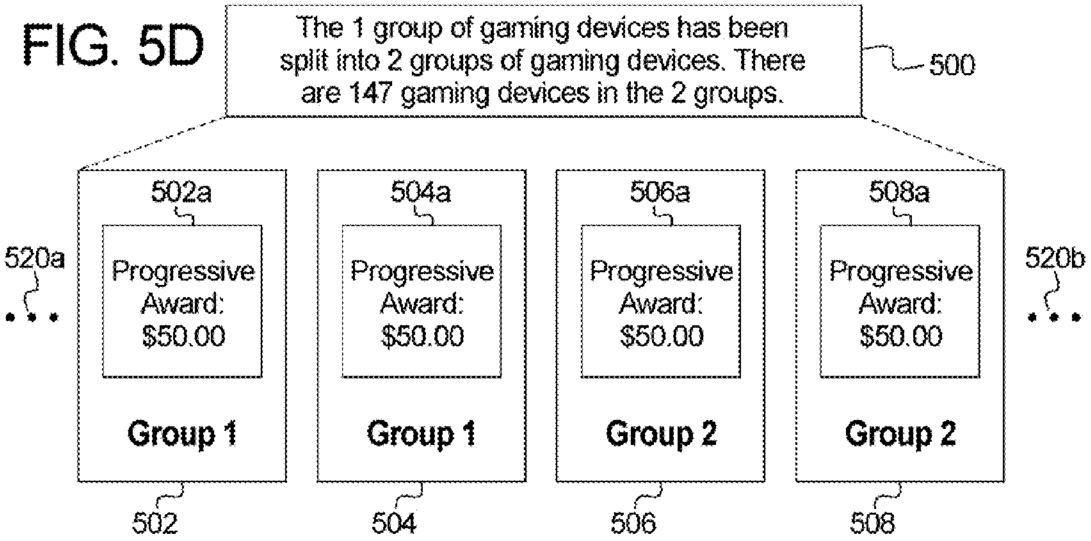
Figure 5E:
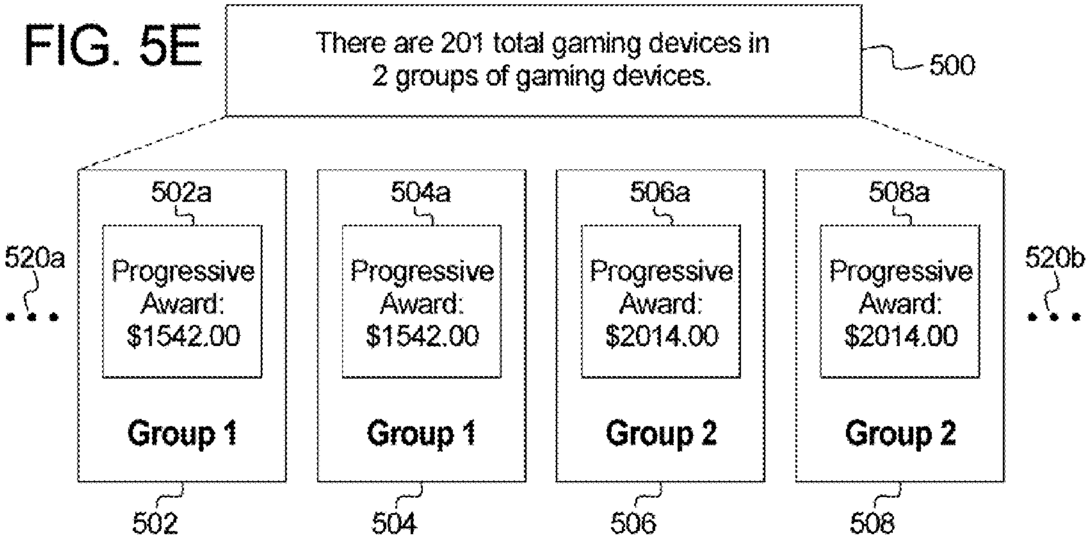

It should be appreciated that point in time 410 of FIG. 4 corresponds with the schematic representation of the gaming system illustrated in FIG. 5A, point in time 420 of FIG. 4 corresponds with the schematic representation of the gaming system illustrated in FIG. 5B, point in time 430 of FIG. 4 corresponds with the schematic representation of the gaming system illustrated in FIG. 5C, point in time 440 of FIG. 4 corresponds with the schematic representation of the gaming system illustrated in FIG. 5D, and point in time 450 of FIG. 4 corresponds with the schematic representation of the gaming system illustrated in FIG. 5E.

In the embodiment illustrated in FIGS. 4 and 5A, 5B, 5C, 5D, and 5E, the gaming system is configured to monitor the quantity of gaming devices of a group of gaming devices, and to determine whether to disassociate or cleave one or more gaming devices from the group based on the quantity of gaming devices of the group. Specifically, the gaming system is configured to disassociate at least one gaming device from a group of gaming devices when the number of gaming devices of the group exceeds one-hundred-twenty gaming devices. Further, in the illustrated embodiment, the gaming system does not perform the described disassociation until an appropriate reconfiguration event has occurred. In the illustrated embodiment, the reconfiguration event occurs when one of the players of the group of gaming devices wins the progressive award of that group. Thus, to perform the described disassociation for the illustrated embodiment, the gaming system must determine 1) that the upper progressive award reconfiguration threshold has been exceeded and 2) that one of the players has won the progressive award.

FIGS. 4 and 5A each illustrate and describe the disclosed gaming system at point in time 410. At point in time 410, the gaming system of the illustrated embodiment includes a plurality of gaming devices including gaming devices 502, 504, 506, and 508. As illustrated in the explanation section 412 of point in time 410, the gaming system enables a player at each of the gaming devices to wager on plays of a game associated with a progressive award. Moreover, the explanation section 412 indicates that at point in time 410, the gaming system enables gaming devices to be added to and/or removed from the gaming system, such as by players beginning to or ceasing to wager on plays of a game of one or more gaming devices. At the point in time 410, players are currently wagering on plays of a game at a single group of gaming devices, as indicated in group summary section 414. As further indicated in group summary section 414, the single group of gaming devices includes sixty-eight gaming devices, wherein players at each gaming device are wagering on plays of a game in an effort to win a progressive award having a value of one-thousand-sixty-seven dollars. The upper progressive award reconfiguration threshold for the group of gaming devices is one-hundred-twenty gaming devices. That is, if the quantity of gaming devices of the first (and, at point in time 410, only) group of gaming devices exceeds one-hundred-twenty gaming devices, the gaming system will disassociate or cleave at least one gaming device from the group. The community display 500 reflects this information, indicating that the gaming system includes a single group of gaming devices with sixty-eight gaming devices, including gaming devices 502, 504, 506, and 508. As illustrated in progressive award display areas 502*a*, 504*a*, 506*a*, and 508*a*, the progressive award for each gaming device of the single group of the gaming system has a value of one-thousand-sixty-seven dollars.

Referring to FIGS. 4 and 5B, the timeline 400 illustrates in explanation section 422 that at point in time 420, gaming devices are being added to the group of gaming devices until an amount of player activity exceeds the upper progressive award reconfiguration threshold. As indicated by group summary section 424, the gaming system still includes a single group of gaming devices. As further indicated, the quantity of gaming devices in the group of gaming devices has reached one-hundred-twenty-one gaming devices, which includes gaming devices 502, 504, 506, and 508 of FIG. 5B. The progressive award at time 420 for the single group of gaming devices has a value of two-thousand-five-hundred-sixty-nine dollars reflected by progressive award display areas 502*a*, 504*a*, 506*a*, and 508*a*, and the upper progressive award reconfiguration threshold remains at one-hundred-twenty gaming devices. Point in time 420 of timeline 400 also includes a game information display section 426, which indicates that the player activity (i.e., the quantity of gaming devices) of the first group of gaming devices exceeds the upper progressive award reconfiguration threshold at point in time 420. The community display 500 of FIG. 5B similarly indicates that the single group of gaming devices includes one-hundred-twenty-one gaming devices, and that the upper progressive award reconfiguration threshold has been exceeded. Moreover, the progressive award display areas 502*a*, 504*a*, 506*a*, and 508*a* indicate a same progressive award value for each gaming device of two-thousand-five-hundred-sixty-nine dollars.

Point in time 430 of FIG. 4 and FIG. 5C each illustrate the gaming system disclosed herein after an occurrence of a progressive award reconfiguration event such as the event indicated in game information display area 436. Specifically, at point in time 430, the gaming system determines that an outcome of the game of one of the plurality of gaming devices has occurred which results in the progressive award being provided to a player, as indicated by explanation section 432. As indicated by community display 500 of FIG. 5C, the player winning the progressive award represents a progressive award reconfiguration event. The gaming system provides the current progressive award having a value of three-thousand-one-hundred-forty-eight dollars, indicated in group summary section 434 and in progressive award display areas 502*a*, 504*a*, 506*a*, and 508*a*, to one of the players of one of the gaming devices. As indicated in group summary section 434, the number of gaming devices including gaming devices 502, 504, 506, and 508 at point in time 430 is one-hundred-forty-seven, which still exceeds the upper progressive award reconfiguration threshold. Since the quantity of gaming devices exceeds the upper progressive award reconfiguration threshold upon the occurrence of a progressive award reconfiguration event, the gaming system determines that a disassociation or cleaving of at least one of the gaming devices is appropriate.

Point in time 440 of FIG. 4 and FIG. 5D each illustrate the gaming system disclosed herein after performing the above-indicated disassociating based on the occurrence of the progressive award reconfiguration event at point in time 430. At point in time 440, the gaming system dynamically disassociates or cleaves the single group into two distinct groups, as illustrated by explanation section 442 and community display 500 of FIG. 5D. As illustrated in group summary section 444, the gaming system in one embodiment disassociates gaming devices to form a first group including seventy gaming devices and a second group including seventy-seven gaming devices, thus accounting for the totality of the one-hundred-forty-seven gaming devices of the gaming system, as indicated at point in time 430. As further illustrated in group summary section 444, the progressive award for both groups of gaming devices has been reset a same initial or reset amount (sometimes referred to as a seed amount or a reset amount) to fifty dollars, and the upper progressive award reconfiguration threshold for both groups of gaming devices remains at one-hundred-twenty gaming devices. FIG. 5D indicates the cleaving of the group of gaming devices, as gaming devices 502 and 504 are associated with a first group of gaming devices after the cleaving (i.e., the previously existing group of gaming devices), and gaming devices 506 and 508 are associated with a new, second group of gaming devices after the cleaving. The gaming system resets the progressive awards for both groups of gaming devices to same initial values of fifty dollars, as indicated in progressive award display areas 502*a*, 504*a*, 506*a*, and 508*a*. It should be appreciated that the players at each of gaming devices 502, 504, 506, and 508 have identical gaming experiences with respect to the progressive award up to and including the reset of the progressive award and the split of the groups of gaming devices upon the occurrence of the progressive award reconfiguration event, as each of the players sees the progressive award reset to the same initial or reset amount.

Referring to FIGS. 4 and 5E, the gaming system enables players to continue wagering on plays of the game provided by the gaming devices of the two groups of gaming devices. At point in time 450, as illustrated in the explanation section 452, the gaming system enables players at the plurality of gaming devices of both groups of gaming devices to wager on plays of a game associated with progressive awards. Moreover, the gaming system enables gaming devices to be added to and/or to leave the groups of gaming devices. It should be appreciated that in one embodiment, the gaming system enables this adding of gaming devices until the amount of player activity again exceeds the upper progressive award reconfiguration threshold. The group summary section 454 of FIG. 4 and the community display 500 of FIG. 5E indicate that at point in time 450, the gaming system is providing two groups of gaming devices at point in time 450, with the first group having ninety-eight gaming devices (including gaming devices 502 and 504) and the second group having one-hundred-three gaming devices (including gaming devices 506 and 508). As further illustrated by group summary section 454 and in progressive award display areas 502*a*, 504*a*, 506*a*, and 508*a*, the progressive award at point in time 450 for the first group has a value of one-thousand-five-hundred-forty-two dollars and the progressive award for the second group has a value of two-thousand-fourteen dollars. It should thus be appreciated that the progressive awards increase at different rates, and that though the progressive awards reset to the same initial value (i.e., following point in time 440), the gaming experiences with respect to the progressive award of players of the gaming devices 502, 504, 506, and 508 differ following the disassociating or cleaving of the groups.

It should be appreciated that the timeline 400 describes five points in time 410, 420, 430, 440, and 450 with respect to a single group of gaming devices. It should also be appreciated that the timeline 400 in various embodiments applies to a plurality of groups of gaming devices substantially simultaneously. It should be further appreciated that the while in the illustrated embodiment, the gaming system disassociates or splits gaming devices into two different groups of gaming devices, the disclosed gaming system may disassociate or cleave the group of gaming devices into three or more new groups of gaming devices, or may associate one or more disassociated or cleaved gaming devices with a previously-existing group of gaming devices. That is, FIGS. 4 and 5A, 5B, 5C, 5D, and 5E illustrate an example timeline and schematic representations of the gaming system as applied in the context of a single group of gaming devices disassociated or split into two groups of gaming devices. The principles illustrated therein and described above are equally applicable in the context of multiple gaming devices disassociated or split into multiple existing or new groups of gaming devices.

The disclosed gaming system is also configured to disassociate or cleave one or more gaming devices from one or more groups of gaming devices to form a plurality of groups of gaming devices based on a plurality of progressive awards simultaneously available to each gaming device. The gaming system disclosed herein provides each of a plurality of players an opportunity to win more than one progressive award for a single play of a game. For example, the gaming system provides a multiple level progressive award, such as a high progressive award and a low progressive award. In this embodiment, the gaming system initially maintains only a single group of gaming devices, and provides each player of the single group of gaming devices with an opportunity to win either the high level progressive award or the low level progressive award for a play of the game. Further, the gaming system stores an upper progressive award reconfiguration threshold and a lower progressive award reconfiguration threshold associated with each of the plurality of progressive awards, such that disassociating or cleaving occurs for one or more but not all of the progressive awards. For example, the gaming system disassociates or cleaves a group of gaming devices into two or more groups, such that each player at each of the groups has an opportunity to win the same high progressive award, but such that each player of the individual groups has an opportunity to win only the low progressive award associated with that player's group. Moreover, the gaming system in one embodiment is configured to detect a progressive award reconfiguration threshold for each of the plurality of progressive awards, such as a player winning that particular progressive award.

In one embodiment, wherein the gaming system maintains a single group of gaming devices having a high progressive award and a low progressive award, the gaming system monitors the player activity as described above. The gaming system compares the player activity determined for the group of gaming devices with the progressive award reconfiguration thresholds associated with the high progressive award and the low progressive award. If a progressive award reconfiguration event occurs with respect to either level of progressive award (i.e., if a player wins either the high progressive award or the low progressive award), the gaming system compares the player activity for that progressive award with the appropriate progressive award reconfiguration thresholds. That is, the gaming system compares the player activity for the group of gaming devices with the thresholds associated with the high award if the progressive award reconfiguration event includes one of the players winning the high progressive award and compares the player activity for the group of gaming devices with the thresholds associated with the low progressive award if the progressive award reconfiguration event includes one of the players winning the low progressive award.

If a player wins the low progressive award and the gaming device determines that the player activity exceeds the upper progressive award reconfiguration threshold associated with the low progressive award, the gaming system dynamically disassociates or cleaves a subset of the gaming devices of the group of gaming devices and associates those gaming devices with a new or existing group of gaming devices and resets the low progressive award to a same value for any new group. In this embodiment, the gaming system continues to provide the players at the existing group and any new groups with the opportunity to win the high progressive award. That is, the gaming system dynamically cleaves the group into two separate groups with respect to the low progressive award, and continues to operate the gaming system as a single group with respect to the high progressive award.

If the progressive award reconfiguration event occurs for the high progressive award (i.e., if a player wins the high progressive award), the gaming system determines whether the player activity at the group of gaming devices with respect to the high progressive award exceeds the upper progressive award reconfiguration threshold associated with the high progressive award. If it does, the gaming system dynamically disassociates or cleaves that group into two or more groups, assigning a subset of the gaming devices to the first group with respect to the high progressive award and a different subset of the gaming devices to the second group with respect to the high progressive award. The gaming system resets the high progressive award and provides a separate high progressive award to each new group of gaming devices, each high progressive award being funded by wagers on plays of the games of the gaming devices of the assigned group. It should thus be appreciated that the disclosed system is applicable with multiple level progressive awards by maintaining groups of gaming devices applicable for each of the levels of progressive awards provided by the gaming system.

Figure 6A:
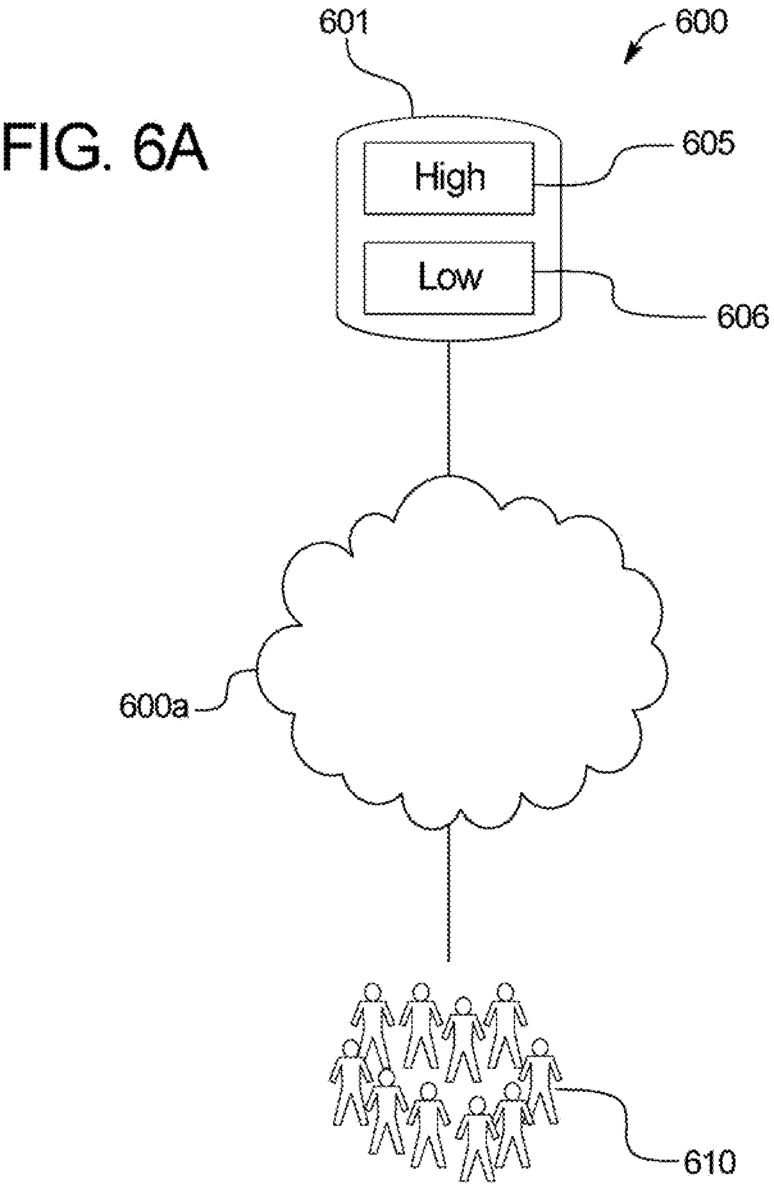
FIG. 6A is a schematic representation of a single group of gaming devices which provides players an opportunity to win a high progressive award and a low progressive award.

FIG. 6A illustrates a schematic representation 600 of a single group of gaming devices 601 at a first point in time which provides players 610 with opportunities to wager on plays of a game and to win either of a high progressive award 605 and a low progressive award 606. The schematic representation 600 includes a network cloud 600*a*, such as an Internet cloud. The gaming system illustrated in FIG. 6A provides each of the players 610 of the group of gaming devices 601 with opportunities to wager on plays of the game over the network 600*a*. For example, the gaming system enables the players 610 to wager on plays of the game using remote personal electronics devices, such as personal computers, PDAs, mobile telephones, tablet computers, or other suitable personal electronic devices with access to the network 600*a*. Thus, it should be appreciated that players 610 could be spread out geographically, such as across a state, country, or other appropriate jurisdiction, and could each be wagering on plays of the game to win a same progressive award or progressive awards.

In the embodiment illustrated in FIG. 6A, the gaming system stores a separate upper progressive award reconfiguration threshold for the single group 601 for the high progressive award 605 and the low progressive award 606. The single group of gaming devices 601 has a sufficiently small number of players wagering that the quantity indicative of player activity does not exceed the upper progressive award reconfiguration threshold with respect to either the high progressive award or the low progressive award. Thus, the illustrated group 601 does not split into multiple groups at the first point in time, even if a progressive award reconfiguration event occurs, such as one of the players winning either the high progressive award or the low progressive award.

Figure 6B:
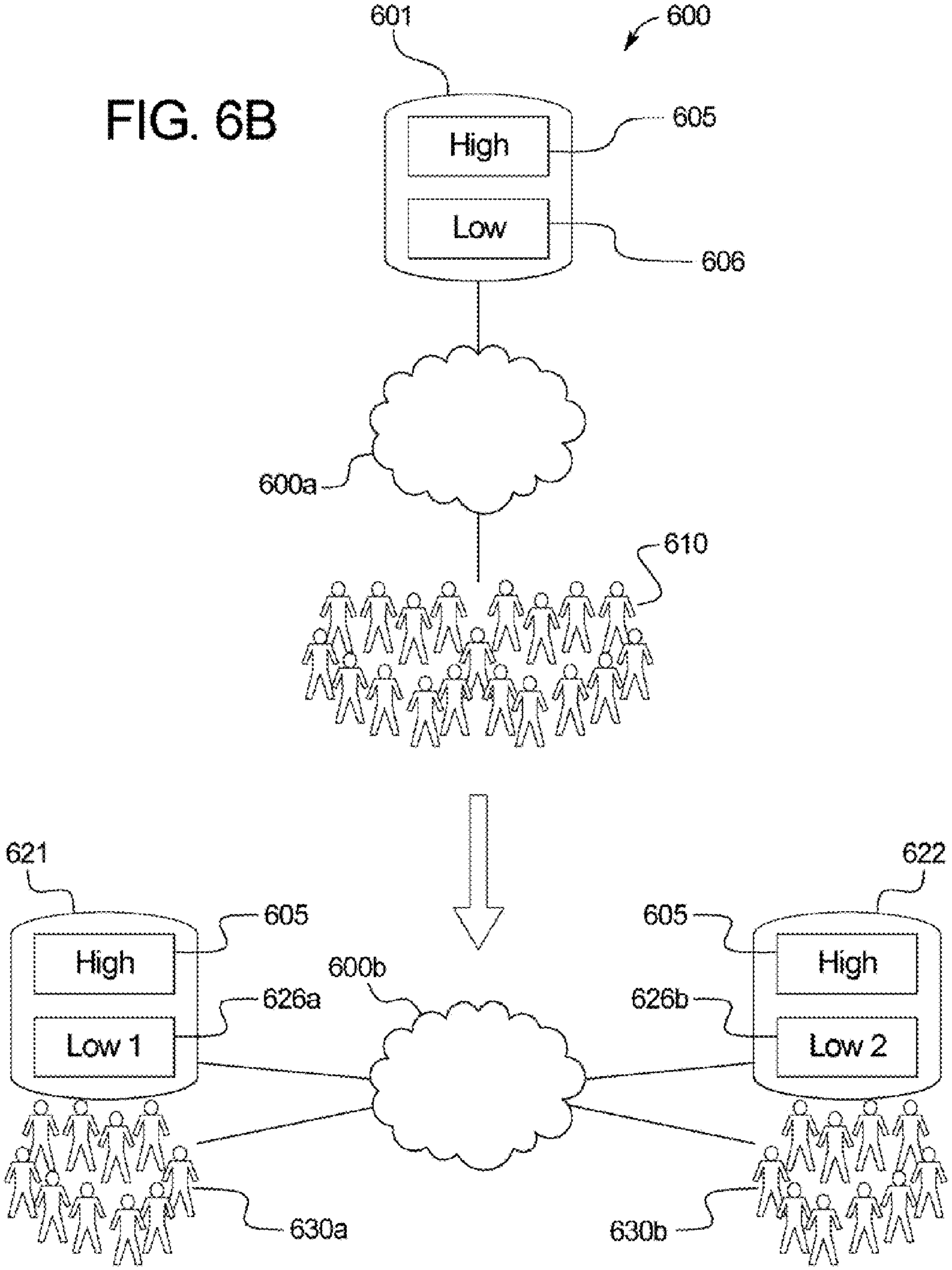
FIG. 6B is a schematic representation of the single group of gaming devices with respect to the low progressive award of FIG. 6A splitting into multiple banks of gaming devices with respect to the low progressive award.

FIG. 6B illustrates a schematic representation 620 of the group of gaming devices 601 at a second point in time. In FIG. 6B, the players 610 of the group of gaming devices 601 is still accessing the gaming system (i.e., wagering on plays of the game) via the network 600*a*. That is, the players 610 are placing wagers using one or more personal electronic devices that access the gaming system by the network 600*a*. In the illustrated embodiment, the number of players wagering on plays of the game 610 has increased. It should be appreciated that in one embodiment, the implementation of the disclosed gaming system in an internet embodiment (i.e., over the network 600*a*), enables this increase in the quantity of players wagering because each additional player 610 merely needs to log on to the network via his or her personal electronic device.

In the illustrated embodiment, the number of players 610 wagering on plays of the game has increased sufficiently such that the upper progressive award reconfiguration threshold with respect to the low award 606 has been exceeded. Thus, for an occurrence of the progressive award reconfiguration event with respect to the low progressive award (i.e., one of the players 610 winning the low progressive award), the gaming system dynamically splits the single group of gaming devices 601 into multiple groups of gaming devices 621 and 622 with respect to the low progressive award. Thereafter, group 621 is associated with a first low progressive award 626*a* and group 622 is associated with a second low progressive award 626*b*. Both groups of gaming devices 621 and 622 remain associated with the same high progressive award 605. The gaming system assigns a subset of the players 630*a* and 630*b* to each group of gaming devices 621 and 622, respectively, such that the subset 630*a* can wager on plays of a game to win either the high progressive award or the first low progressive award and such that the subset 630*b* can wager on plays of a game to win either the high progressive award or the second low progressive award.

As illustrated in FIG. 6B, after the subsets of players 630*a* and 630*b* have begun wagering on plays of the games at the groups of gaming devices 621 and 622, respectively, the gaming system provides those players with access to the gaming system through a network illustrated by cloud 600*b*. It should be appreciated that network 600*b* is similar to network 600*a*, except that network 600*b* supports two groups of gaming devices 621 and 622 and enables the players in the groups 630*a* and 630*b* to wager on the groups of gaming devices 621 and 622, respectively. Thus, in the illustrated embodiment, each of the players of the subsets of players 630*a* and 630*b* is still wagering on plays of the game at his or her respective group of gaming devices 621 or 622 by accessing the gaming system over network 600*b*.

Figure 6C:
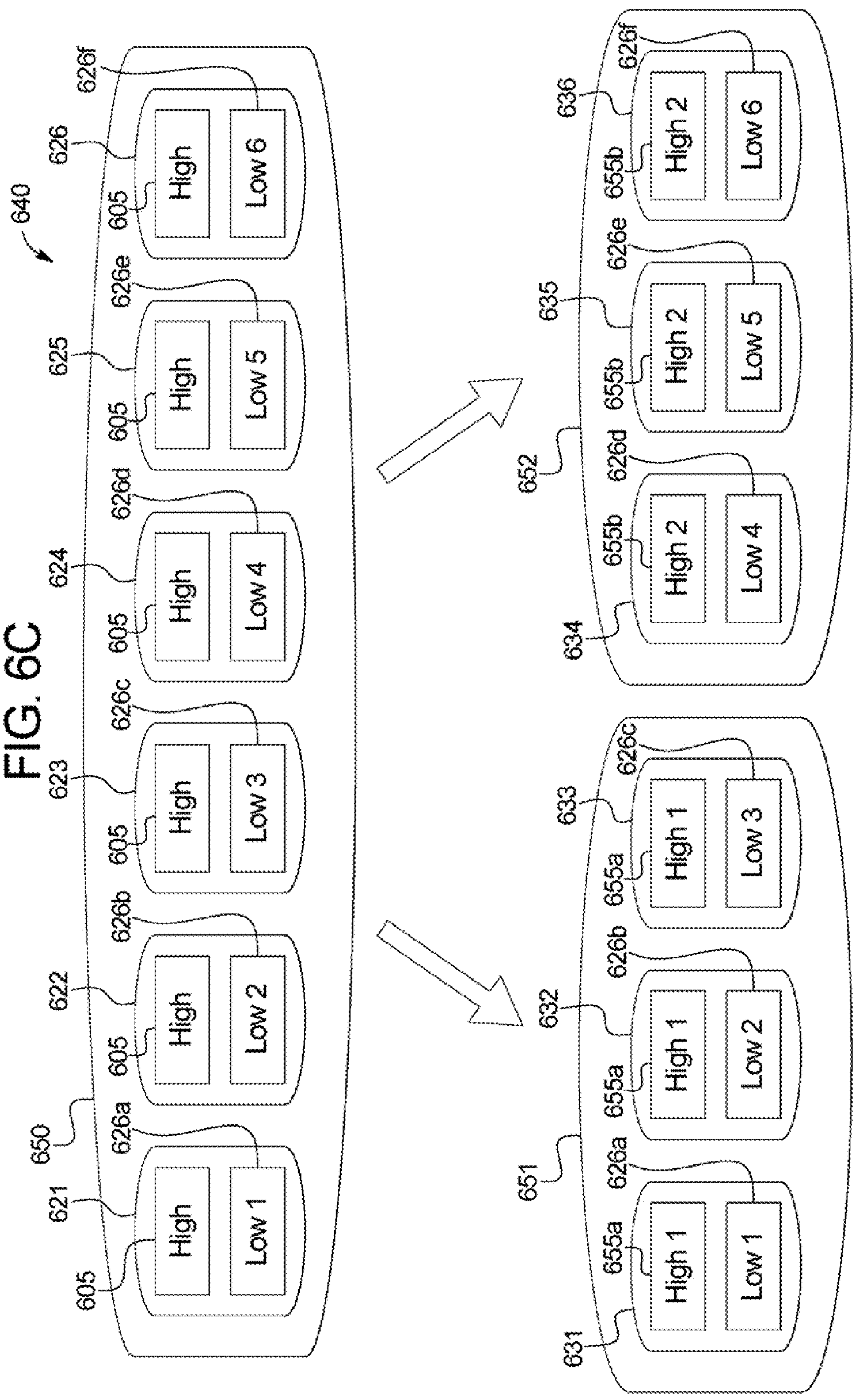
FIG. 6C is a schematic representation of the single group of gaming devices with respect to the high progressive award of FIG. 6B splitting into multiple groups of gaming devices with respect to the high progressive award.

FIG. 6C illustrates a schematic representation 640 of a plurality of groups of gaming devices of the disclosed gaming system at a third point in time. The gaming system includes a single group of gaming devices 650 with respect to the high progressive award 605 and six groups of gaming devices 621, 622, 623, 624, 625, and 626 with respect to six different lower progressive awards 626*a*, 626*b*, 626*c*, 626*d*, 626*e*, and 626*f*. Further, the gaming system enables the players at each individual group of gaming devices 621, 622, 623, 624, 625, and 626 with respect to the low progressive award to wager on the associated low progressive award 626*a*, 626*b*, 626*c*, 626*d*, 626*e*, and 626*f*, respectively. The gaming system enables each of the players at the single group 650 with respect to the upper progressive award to wager on the high progressive award 605.

In the embodiment illustrated in FIG. 6C, the quantity of players wagering on the upper progressive award has exceeded the upper progressive award reconfiguration threshold with respect to the high progressive award 605, so the gaming system dynamically disassociates or splits the single group of gaming devices 650 with respect to the high progressive award. As illustrated, the gaming system dynamically disassociates gaming devices from the single group 650 with respect to the high progressive award so as to result in two groups 651 and 652 with respect to the high progressive award. Upon such disassociating, the gaming system enables the players at the group 651 with respect to the high progressive award (which includes the players at groups 631, 632, and 633 with respect to low progressive awards 626*a*, 626*b*, and 626*c*, respectively) to wager on a first high progressive award 655*a*. Further, the gaming system enables the players at the group 652 with respect to the high progressive award (which includes the players at groups 634, 635, and 636 with respect to low progressive awards 626*d*, 626*e*, and 626*f*) to wager on a second high progressive award 655*b*.

It should be appreciated that the players wagering on plays of the game as illustrated in FIG. 6C are still accessing the gaming system (and the included groups of gaming devices) via a network such as the network 600*a* illustrated in FIGS. 6A and 6B. In the illustrated embodiment of FIG. 6C, the network cloud 600*a* is not shown for clarity.

It should thus be appreciated that the principles described above with respect to disassociating or cleaving gaming devices from groups of gaming devices associated with progressive awards is equally applicable to gaming systems which implement single level progressive awards and to gaming systems which implement multiple level progressive awards. In the multiple-level embodiment, the gaming system maintains a plurality of groups of gaming devices with respect to any different levels of progressive awards, including progressive award reconfiguration thresholds for each such group of gaming devices with respect to the levels of progressive awards. The gaming system also maintains progressive award reconfiguration thresholds with respect to the multiple levels of progressive awards. Upon occurrences of progressive award reconfiguration events for one of the levels of progressive awards, the gaming system compares player activity with respect to that level with the progressive award reconfiguration thresholds with respect to that level to determine whether to split or cleave gaming devices into a different group of gaming devices with respect to that level.

Figure 7:
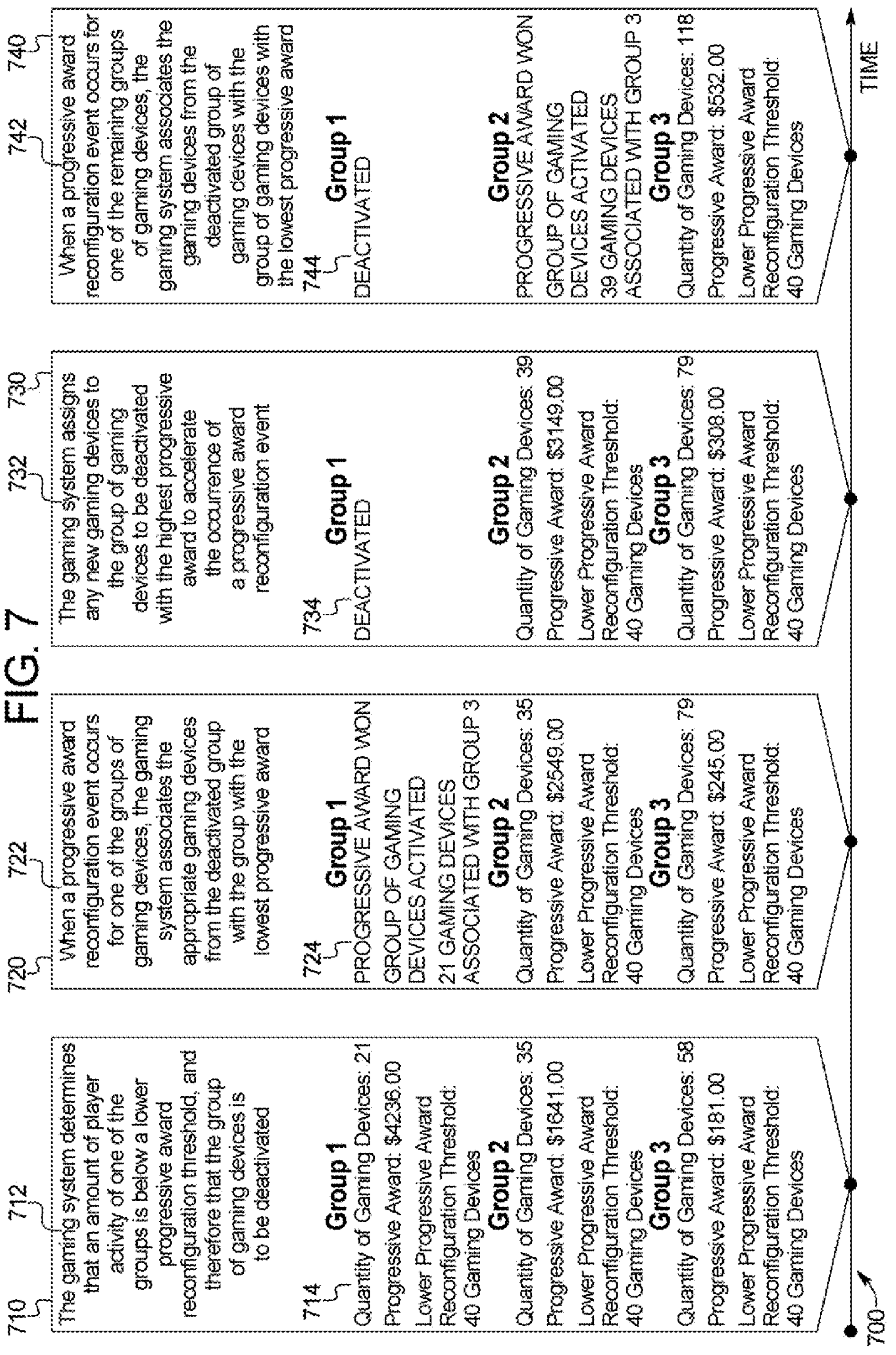
FIG. 7 illustrates a timeline of an example period of operation of the gaming system disclosed herein.

FIG. 7 illustrates a timeline 700 of an example period of operation of the gaming system disclosed herein. Specifically, FIG. 7 illustrates a timeline 700 including four distinct points in time 710, 720, 730, and 740 during which the player activity of the disclosed gaming system is generally decreasing. In the illustrated embodiment, this decrease in player activity is caused by players currently wagering on plays of games of a plurality of gaming devices ceasing to wager on additional plays of the games. Each point in time 710, 720, 730, and 740 of the timeline 700 includes an explanation section 712, 722, 732, and 742, respectively, summarizing the activity which has occurred prior to that point in time. Timeline 700 also indicates, for each point in time 710, 720, 730, and 740, a group summary section 714, 724, 734, and 744, respectively, which summarizes the state of the groups of the gaming system at that point in time.

FIGS. 8A, 8B, 8C, and 8D each illustrate schematic representations of the gaming system disclosed herein including a community display 800 which summarizes the state of the gaming system and a plurality of gaming devices of the gaming system. Specifically, FIGS. 8A, 8B, 8C, and 8D illustrate gaming devices of the gaming system including gaming devices 802, 804, 806, 808, 810, and 812. Ellipses 820*a*, 820*b*, and 820*c* indicate that gaming devices 802, 804, 806, 808, 810, and 812 are a subset of the total quantity of gaming devices in the gaming system. Each illustrated gaming device 802, 804, 806, 808, 810, and 812 includes a progressive award display area 802*a*, 804*a*, 806*a*, 808*a*, 810*a*, and 812*a* respectively, which indicates the current progressive award value for that gaming device. Each gaming device further indicates the group of gaming devices to which that gaming device currently belongs. It should be appreciated that point in time 710 of FIG. 7 corresponds with the schematic representation of the gaming system illustrated in FIG. 8A, point in time 720 of FIG. 7 corresponds with the schematic representation of the gaming system illustrated in FIG. 8B, point in time 730 of FIG. 7 corresponds with the schematic representation of the gaming system illustrated in FIG. 8C, and point in time 740 of FIG. 7 corresponds with the schematic representation of the gaming system illustrated in FIG. 8D.

Figure 8A:
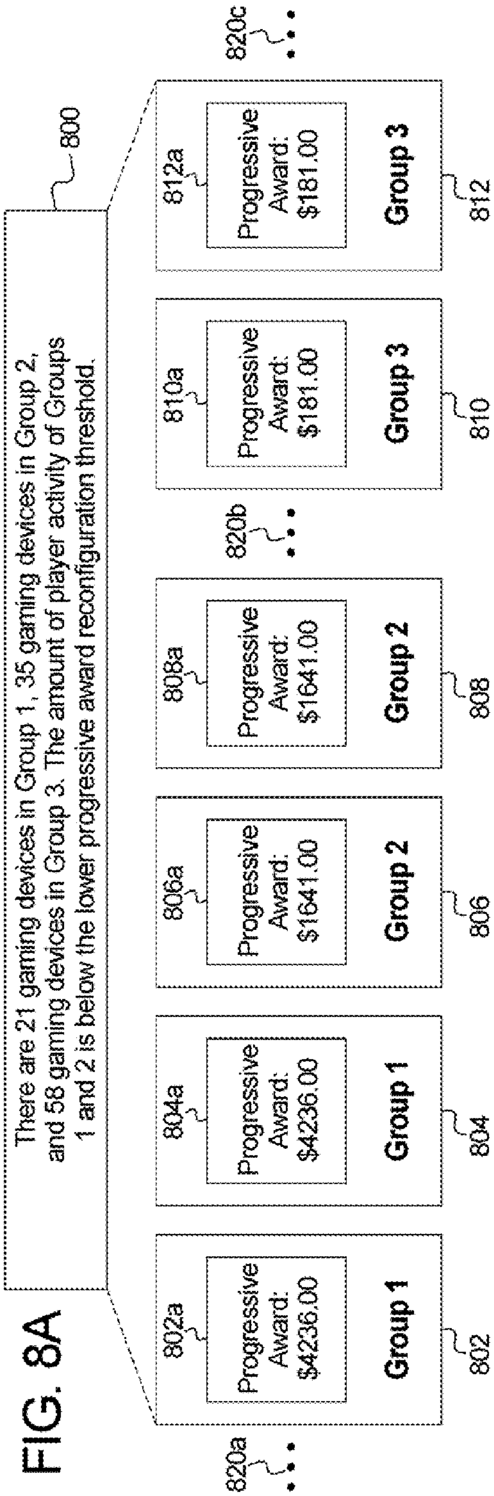
FIGS. 8A, 8B, 8C, and 8D are each schematic representations of the gaming system disclosed herein at one of a plurality of points in time including a schematic representation of the plurality of gaming devices of the gaming system.

Referring first to FIGS. 7 and 8A, the gaming system determines at point in time 710 that the amount of player activity of at least one of the groups of gaming devices is below a lower progressive award reconfiguration threshold, as indicated by explanation section 712 and community display 800. Specifically, as indicated by community display 800, the amount of player activity of the first and second groups, determined based on the quantity of gaming devices of each of the groups, is below the lower progressive award reconfiguration threshold. As indicated in group summary section 714, the first group of gaming devices includes twenty-one gaming devices, a progressive award having a value of four-thousand-two-hundred-thirty-six dollars, and a lower progressive award reconfiguration threshold of forty gaming devices, the second group includes thirty-five gaming devices, a progressive award having a value of one-thousand-six-hundred-forty-one dollars, and a lower progressive award reconfiguration threshold of forty gaming devices, and the third group of gaming devices includes fifty-eight gaming devices, a progressive award having a value of one-hundred-eighty-one dollars, and a lower progressive award reconfiguration threshold of forty gaming devices. Based on the indication that the first group and the second group each include a quantity of gaming devices below the lower progressive award reconfiguration threshold, the gaming system indicates in explanation section 712 that at point in time 710, at least one of the groups of gaming devices is to be deactivated to maintain a desired game play experience for the plurality of players. The community display 800 of FIG. 8A indicates the quantity of gaming devices in each group of gaming devices, and indicates that gaming devices 802 and 804 are associated with the first group, gaming devices 806 and 808 are associated with the second group, and gaming devices 810 and 812 are associated with the third group. The progressive award display areas 802*a*, 804*a*, 806*a*, 808*a*, 810*a*, and 812*a* each indicate the respective progressive awards of each of the groups of gaming devices.

Figure 8B:
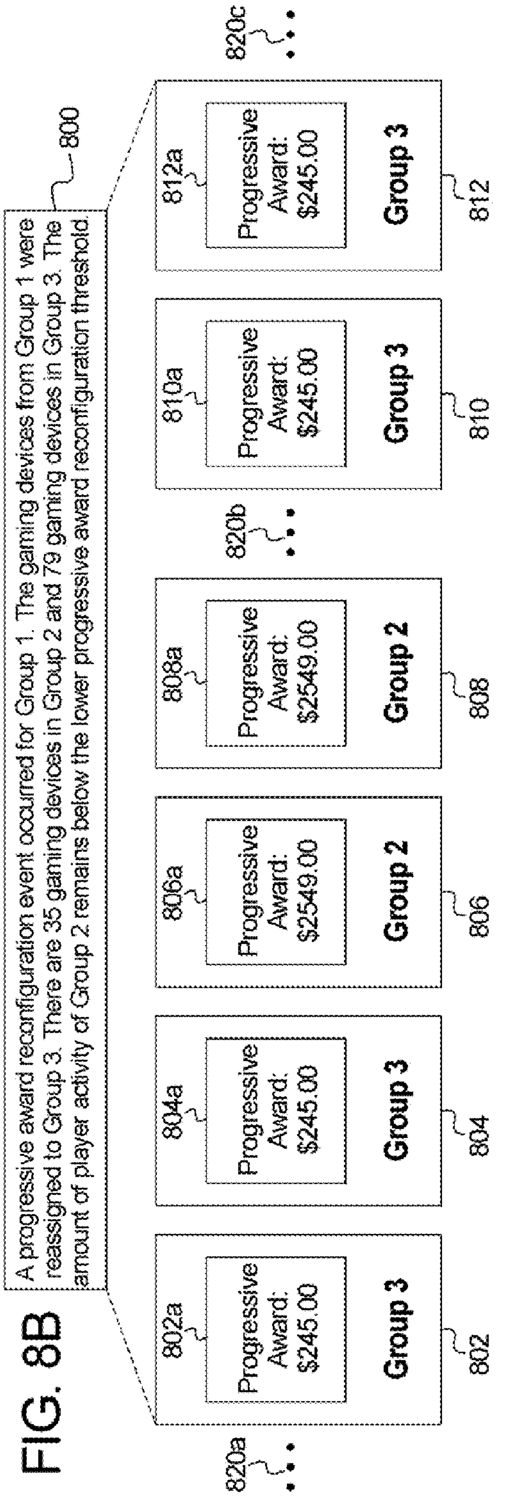

FIGS. 7 and 8B illustrate the state of the disclosed gaming system at point in time 720. Specifically, as indicated in explanation section 722, when a progressive award reconfiguration event occurs for one of the groups of gaming devices, the gaming system associates any appropriate gaming devices from a deactivated group with the remaining group of gaming devices having the lowest current progressive award value. As indicated in the group summary section 724, the progressive award reconfiguration event occurs for a gaming device of the first group prior to point in time 720. Since the first group included twenty-one gaming devices, the gaming system associates those twenty-one gaming devices with the third group, which has the lowest progressive award value of the remaining groups. This assignment of the gaming devices of the first group is further reflected in community display 800. FIG. 8B illustrates the gaming system after such an association. Specifically, gaming devices 802 and 804, which were previously associated with the first group, are now associated with the third group and enable the players at each of those gaming devices to wager on the progressive award of the third group (i.e., the same progressive award as that associated with gaming devices 810 and 812). The gaming devices 806 and 808 of the second group enable the players to continue to wager on plays of the game to win the progressive award associated with the second group. As illustrated in FIGS. 7 and 8B, after assignment of the appropriate gaming devices, the second group includes thirty-five gaming devices and the third group includes seventy-nine gaming devices. The player activity for the second group remains below the lower progressive award reconfiguration threshold.

Figure 8C:
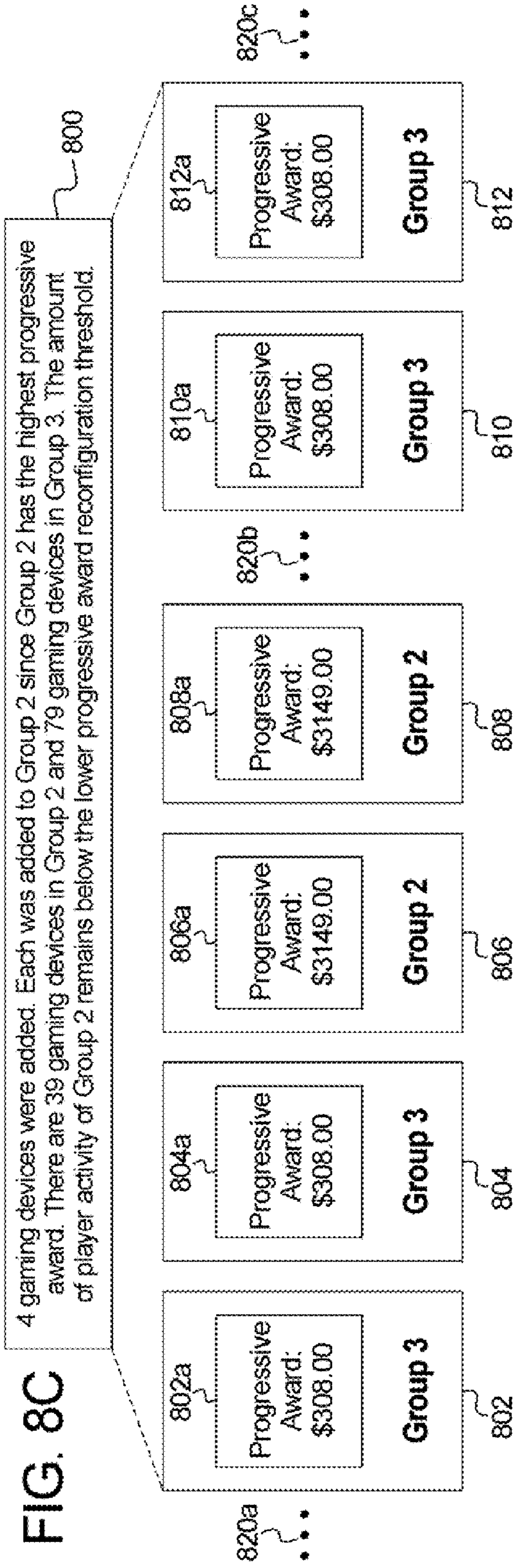

FIGS. 7 and 8C illustrate the state of the disclosed gaming system at point in time 730. It should be appreciated that prior to point in time 730, four new players at four new gaming devices began wagering on plays of the game. As illustrated in explanation section 732, the gaming system associates any new gaming devices (i.e., gaming devices of players who have recently begun wagering on plays of the games) with the group of gaming devices to be deactivated with the highest progressive award. As further indicated, these new players are associated with this group to be deactivate to accelerate the occurrence of the progressive award reconfiguration event for the group of gaming devices to be deactivated (i.e., by increasing the frequency of wagers on plays of the game). As indicated in the group summary section 734, the gaming system has deactivated the first group at point in time 730. The third group still includes seventy-nine gaming devices, as discussed above. The gaming system associates the four new gaming devices with the second group since the second group has the highest progressive award of any group to be deactivated. In the illustrated embodiment, such an association increases the quantity of gaming devices of the second group of gaming devices to a total of thirty-nine. Since this quantity remains below the lower progressive award reconfiguration threshold, the gaming system will still deactivate the second group of gaming devices upon an occurrence of a progressive award reconfiguration event. FIG. 8C illustrates that the four gaming devices were added, and indicates that gaming devices 802, 804, 810, and 812 belong to the third group of gaming devices and that gaming devices 806 and 808 belong to the second group. It should be appreciated that the four new gaming devices are not illustrated as gaming devices in FIG. 8C, but that the addition of such gaming devices to the second group is reflected by the summary displayed in the community display area 800.

Figure 8D:
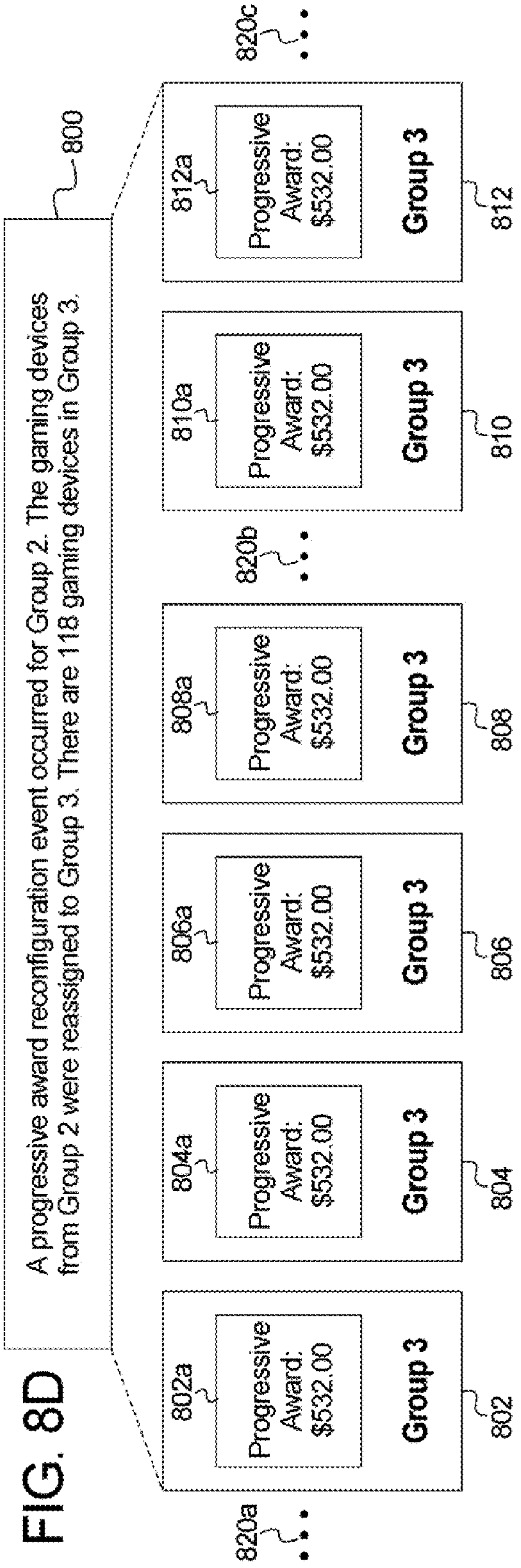

FIGS. 7 and 8D illustrate point in time 740, at which the second group of gaming devices has also been deactivated. Specifically, as indicated in explanation section 742, a progressive award reconfiguration event has occurred for one of the remaining groups of gaming devices (i.e., a player wagering on plays of a game of the second group has won the progressive award). Since the player activity of the second group is below the lower progressive award reconfiguration threshold, the gaming system deactivates the second group of gaming devices, as indicated in group summary section 744. As further indicated in group summary section 744, the gaming system associates the thirty-nine gaming devices previously in the second group with the third group of gaming devices, increasing the total quantity of gaming devices of the third group of gaming devices to one-hundred-eighteen. It should be appreciated that after such an association, the player activity of the third group of gaming devices is above the lower progressive award reconfiguration threshold of forty gaming devices, and thus the gaming system is operating within the parameters defined by such a threshold. The community display 800 of FIG. 8D illustrates that the progressive award reconfiguration event occurred for the second group, and that the gaming devices from the second group were associated with the third group. Further, as illustrated, each of gaming devices 802, 804, 806, 808, 810, and 812 is contained within the third group, and is associated with the same progressive award of five-hundred-thirty-two.

It should be appreciated that the above-described comparison of player activity to an upper and/or lower progressive award reconfiguration threshold enables the gaming system to provide gaming activity within a desired range of activity. In one embodiment, this results in a reasonably consistent gaming experience from within a desired range of experiences to a plurality of players of the gaming system without substantially altering the probabilities of winning progressive awards and without substantially altering the initial or reset amounts of the progressive awards.

It should be appreciated that in various embodiments, the gaming system assigns gaming devices of a deactivated group of gaming devices to the group of gaming devices with the highest current progressive award value to accelerate the occurrence of an outcome associated with the progressive award, as discussed above. The association of these gaming devices increases the player activity of the transferee group to a level which exceeds the lower progressive award reconfiguration threshold. In various embodiments, the gaming system determines whether to deactivate the transferee group based on player activity which was previously below the lower progressive award reconfiguration threshold.

In one embodiment, the progressive award reconfiguration thresholds are determined prior to any player wagering on any plays of the game of a group of gaming devices. In another embodiment, the gaming system enables an operator of the gaming system to alter the progressive award reconfiguration threshold based on a desired gaming experience of the players of the gaming system. In one embodiment, the gaming system automatically alters at least one of the progressive award reconfiguration thresholds based on the player activity of the gaming system, such as based on the quantity of gaming devices of the groups of the gaming system. In various embodiments, at least one of the progressive award reconfiguration thresholds is predetermined, randomly determined, determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system determines that the player activity exceeds the upper progressive award reconfiguration threshold for a group of gaming devices based on a level of play of the plurality of players at the group of gaming devices. In an internet embodiment, the gaming system determines the quantity of player activity by determining the total number of players connected to a particular server and wagering on a particular progressive award. The gaming system alternatively quantifies the player activity by determining a total number of players wagering on plays of a game over a specified period of time, such as over the course of a day, a week, or a set of peak hours of operation. In one embodiment, the gaming system quantifies the player activity by determining an average number of players wagering on plays of a game over a specified period of time. In other embodiments, the gaming system quantifies player activity based on a number of players simultaneously wagering on plays of the game, a total number of attempts or tries to win a progressive award over a period of time (i.e., for a game wherein the amount of a wager increases the probability of winning the progressive award), a number of hits of the progressive award over a period of time, a progressive award growth rate over a period of time, or any other suitable mechanism for quantifying player activity.

In one embodiment, when the gaming system determines that the player activity exceeds the upper progressive award reconfiguration threshold for a group of gaming devices, the gaming system dynamically disassociates or splits at least one gaming device from the group of gaming devices. In one such embodiment, the gaming system disassociates one or more gaming devices from the group of gaming devices by randomly selecting at least one gaming device for disassociating and by creating a new group of gaming devices with any such selected gaming devices.

In another embodiment, the gaming system determines at least one characteristic of each gaming device of the group of gaming devices and selects at least two gaming devices with similar characteristics for disassociation. In this embodiment, the gaming system is configured to disassociate or split gaming devices from groups of gaming devices such that gaming devices or players with similar characteristics remain at the same group of gaming devices. In one such embodiment, the gaming system determines the characteristic of the gaming devices based on information about the player determined through a player tracking system, such as the player's name, the player's zip or postal code, or the player's email address. In other embodiments, the gaming system determines player characteristics based on information about players' gaming histories, such as player referral information, player casino affiliation, player casino community affiliation, or player gaming levels. In still other embodiments, the gaming system determines the player characteristics based on information associated with the gaming devices, such as an Internet Protocol (IP) address, a physical location of the gaming devices, or other suitable information associated with the gaming devices.

In one embodiment, the gaming system dynamically disassociates or splits at least one gaming device from a group of gaming devices simultaneously with a reset of the progressive award associated with that group such that each of the players of each of the gaming devices has a substantially identical gaming experience. Specifically, the gaming system provides a different progressive award to the players at any groups resulting from the disassociation or splitting of at least one gaming device from the group of gaming devices. However, each of the progressive awards is reset to a same initial or reset amount, such that the players' gaming experiences with respect to the progressive award after disassociation or splitting are similar. It should be appreciated that after disassociating or splitting, the rate at which the progressive award value increases is based on the player activity at each group of gaming devices. Thus, the gaming experiences with respect to the progressive awards following disassociating or splitting of the awards may vary for a plurality of players.

In one embodiment, when the gaming system determines that the player activity is less than the lower progressive award reconfiguration threshold for a group of gaming devices, the gaming system is configured to rearrange the groups of gaming devices such that certain groups are deactivated or disabled. In various embodiments, the gaming system determines which groups to deactivate or disable based on those groups with relatively low player activity.

In one embodiment, when the gaming system determines that player activity for one of the groups is below the lower progressive award reconfiguration threshold, the gaming system associates the gaming devices of that group of gaming devices with other active groups of gaming devices, such as based on the criteria for assigning new gaming devices described above.

In another embodiment, when the gaming system determines that the amount of player activity of one of the groups of gaming devices is below the lower progressive award reconfiguration threshold, the gaming system determines the gaming devices to reassign based on the group of gaming devices which has the current highest progressive award amount. In this embodiment, the gaming system monitors the group with the highest progressive award amount, and when one of the players of that group wins the progressive award, the gaming system reassigns the players of that group to new groups of gaming devices. The players are thereafter reassigned using the criteria discussed above. In another embodiment, the gaming system reassigns the players to the group of gaming devices with the lowest current progressive award value. It should be appreciated that the player activity at the group whose player activity is below the lower progressive award reconfiguration threshold may remain below the lower progressive award reconfiguration threshold for one or more progressive award reconfiguration events (i.e., one or more hits of a progressive award). The remaining low player activity for that group indicates a continued need to disable or deactivate groups of gaming devices, and thus can be viewed as an indicator that the player activity for the system as a whole is low.

If the player activity for any of the groups is below the lower progressive award reconfiguration threshold, the gaming system associates new gaming devices with groups to facilitate deactivation of certain groups. In one such embodiment, the gaming system is configured not to assign any new gaming devices to (or to enable a player to select) any group of gaming devices which is to be deactivated after a future progressive award hit. In another such embodiment, the gaming system is configured to assign each new player to a group to be deactivated, such that the progressive award for that group hits more quickly based on the increased player activity at that group of gaming devices.

If the gaming system reassigns players from a group which is to be deactivated while the group is associated with a non-zero progressive award, the gaming system distributes the accumulated progressive award amount to at least one other group of the gaming system. For example, the gaming system transfers the entire progressive award amount to another group of gaming devices. Alternatively, the gaming system divides the progressive award amount among a plurality of groups of gaming devices.

One embodiment of the gaming system disclosed herein compares the player activity with any thresholds associated with the gaming system upon the occurrence of a progressive award reconfiguration event. Alternatively, the gaming system compares the player activity with any thresholds substantially continually or regularly throughout the plays of the game prior to a progressive award reconfiguration event. In one such embodiment, if the gaming system determines that one of the groups has associated player activity which is outside the progressive award reconfiguration thresholds, the gaming system stores an indication of such player activity and accordingly splits or reassociates gaming devices with the group upon the next occurrence of the progressive award reconfiguration event.

The gaming system enables an operator to provide a quantity of groups of gaming devices which is reflective of the player activity of the gaming system. It should be appreciated that the gaming system is thus configurable (i.e., by setting the upper and lower progressive award reconfiguration thresholds) to provide players' desired gaming experiences with respect to the progressive award. For example, by setting a relatively high upper progressive award reconfiguration threshold, the gaming system enables a group of gaming devices to dynamically change to provide a game to a plurality of gaming devices with a relatively large amount of player activity (such as wagering activity) before reconfiguration of the group. Thus, the gaming devices generate winning outcomes relatively frequently. Moreover, by setting a relatively high lower progressive award reconfiguration threshold, the gaming system provides players with a gaming experience wherein the progressive award value increases at a relatively high rate. That is, by ensuring that one or more gaming devices is added to the group when the player activity falls below the relatively high lower progressive award reconfiguration threshold, the gaming system ensures a relatively high minimum amount of wagering activity. It should be further appreciated that other combinations of the upper and lower progressive award reconfiguration thresholds enable an operator to provide varying player experiences with respect to the progressive award to conform with the desired experiences of many types of players.

The gaming system disclosed herein enables players to win different types of awards for plays of the game. As described above, the gaming system disclosed herein enables a plurality of players to wager on plays of a game that provide those players with opportunities to win progressive awards. Moreover, the gaming system disclosed herein is configured to dynamically alter groups of gaming devices to provide a desired (e.g., consistent) gaming experience to the plurality of players regardless of the amount of player activity at the gaming system. In addition to enabling players to win a progressive awards for plays of the game, one embodiment of the gaming system disclosed herein also enables players to wager on plays of the game in an effort to win any kind of award represented as an equity build-up. For example, the gaming system can provide players opportunities to win one or more progressive awards that are not funded by player wagers. Alternatively, the gaming system can enable players to wager on plays of the game to win other appropriate types of awards, such as enhancements to potential future wins (e.g., larger award multipliers, greater numbers of bonus opportunities, additional award or bonus triggering opportunities), or other suitable types of equity build-up The gaming system disclosed herein determines one or more characteristics of the players of the gaming devices and alters the players' gaming experiences based on these characteristics. For example, the gaming system determines a characteristic of a player based on one or more of data collected in a player tracking system, a player's standing in a loyalty program, a player's lifetime wager amount, a player's average bet size, a player's initial and/or last buy-in amount for an online gaming provider, a current group roll size for an online gaming provider, a promotional status, a game type history of a player, or a player's play history. The gaming system determines the subset of gaming devices from which the player can select based on a referral which resulted in the player wagering on plays of the game or based on financial information about the player provided by the player prior to the player wagering on any plays of any games. In these embodiments, the gaming system displays the subset of groups of gaming devices and enables the player to select from among the groups.

The gaming system is configured to enable additional players to begin wagering on plays of games at a group of gaming devices. The gaming system associates any new gaming devices with one of a plurality of groups of gaming devices based on one or more characteristics of the gaming device to be added and/or of the player wagering on plays of the game of that gaming device, such as those characteristics indicated above. In one embodiment, the gaming system determines a characteristic of a gaming device prior to a player wagering on a play of the game, and associates that gaming device with a group of gaming devices based on the determined characteristic. In one embodiment, the gaming system automatically associates players with a group of gaming devices with the lowest player activity. In another embodiment, the gaming system automatically assigns players to a showcased group of gaming devices. For example, in an online embodiment, the gaming system could automatically assign players to a group of gaming devices wherein information about the group (i.e., the progressive award value, the number of players wagering, the time since the last progressive award hit, etc.) is broadcast via signage, a gaming establishment website or other appropriate broadcast mechanism. In these embodiments, the gaming system provides players with a continuous or desired gaming experience by associating gaming devices (either upon the gaming device joining the system or upon a disassociation or split of the gaming device from an existing group) with groups of gaming devices based on the set of characteristics.

In one embodiment, the gaming system enables at least one player to select a group of gaming devices to join prior to enabling the player to wager on plays of the disclosed game. For example, the gaming system displays one or more of a minimum wager amount, a maximum wager amount, other limitations to the wagering activity of the group, a quantity of gaming devices of the group of gaming device, the average rate of plays of the game of the group, or the average rate of growth of the progressive award of the group.

The gaming system enable the player to select from among any then-existing groups of gaming devices, such as by displaying the current progressive award for each of the groups of gaming devices. The gaming system alternatively enables a player to select from among a subset of the groups of gaming devices prior to wagering on a play of a game. In one such embodiment, the gaming system determines this subset of the groups of gaming devices based on a characteristic of the groups of gaming devices and/or based on a characteristic of the player. For example, the gaming system determines a subset of groups of gaming devices based on a characteristic of the groups, such as groups with recently reset progressive awards, groups which are designated as showcased groups, groups which have a relatively low amount of wagering activity, or any other suitable characteristic of the groups. In this embodiment, the gaming system provides the player with a choice from among groups with a similar characteristic. It should be appreciated that by providing such a subset of the groups from which the player can select, the gaming system in various embodiments increases the amount of wagering activity at groups with relatively low amounts of wagering activity, increases the quantity of players wagering on plays of a game at a group with a recently reset progressive award, maintains a desired amount of player activity at a showcased group, or otherwise manages the wagering activity at the groups of gaming devices.

The gaming system may determine the subset of groups from which the player can choose based on a characteristic of the player. For example, the gaming system determines the subset of groups from which the player can choose based on the type of game the player has wagered on in the past, such as the volatility of games wagered on by the player, the wager denomination requirements of such games, the number of paylines of such games, whether such games have a cartoon theme, whether such games have a photo theme, the bonuses awarded in such games, or the branding techniques of such games. The subset of groups of gaming devices from which a particular player can select may be predetermined, randomly determined, determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system automatically assigns a player to a group of gaming devices if the player lacks a certain characteristic, and enables the player to select from among a plurality of groups of gaming devices if the player has the certain characteristic. For example, if the player qualifies as a VIP player based on a player tracking system, the gaming system provides the player with a choice from amongst a subset of the groups of gaming devices. If the player does not qualify as a VIP player based on the player tracking system, the gaming system automatically assigns the player to a group of gaming devices, such as to a group of gaming devices with a relatively low amount of player activity.

The gaming system of one embodiment is implemented with differing levels of granularity regarding the contents of the groups of gaming devices. In one embodiment, the gaming system determines which gaming devices to associate with one or more groups on a game-by-game basis. That is, each gaming device at which a player is wagering on plays of the game is associated and/or disassociated with groups of gaming devices individually, regardless of the physical location of that gaming device. In this implementation, any two gaming devices could be associated with the same group of gaming devices or different groups of gaming devices. Further, players at any two gaming devices (i.e., even if they are sitting next to one another at a gaming establishment) could be playing for a different progressive award.

In another embodiment, the gaming system makes determinations as to how to associate and/or disassociate gaming devices with groups of gaming devices at a higher level of granularity. That is, the gaming system makes a single determination regarding associating or disassociating gaming devices for a plurality of different gaming devices. For example, the gaming system makes a single determination as to association and/or disassociation of a plurality of gaming devices of a group of gaming devices in a gaming establishment. Thus, a single determination results in each of a plurality of gaming devices being associated with or disassociated from a same group of gaming devices. For example, each gaming device of a bank of gaming devices in a gaming establishment is associated with or disassociated from a group of gaming devices together, such that no two gaming machines of the bank are ever associated with different groups of gaming devices. In a further example, determinations as to how to group gaming devices are made on a gaming establishment-by-gaming establishment basis. For example, all gaming devices at a single gaming establishment (e.g., a single casino) are associated with a same group of gaming devices, such that each player at one of the gaming devices of that gaming establishment is playing for the same progressive award.

In one embodiment, gaming devices are associated with and/or disassociated from groups of gaming devices according to one or more characteristics or criteria associated with the players of the gaming devices, such that players sharing a common characteristic or criterion are grouped in the same way. For example, the gaming system groups all players having a VIP status at a given gaming establishment together, such that all VIP players are part of a same group of gaming devices and are wagering on plays of a game to win a same progressive award. In further embodiments, the gaming system groups players according to other characteristics or factors, such as one or more of average wager amounts, typical wager denomination amounts, average play session length, average theoretical win amounts over a period of time, player deposit amounts (either current or historical), player metrics based upon other wagering activity (such as wagering on a sister sports-book website), player longevity, players' preferred games, a ratio of non-promotional play to promotional play (i.e., the extent to which a player takes advantage of various promotions), a value representative of a player's loyalty to a particular gaming establishment, or any other suitable characteristic or criterion of a player.

In some embodiments, the gaming system disclosed herein makes one or more determinations regarding which group of gaming devices with which to associate a player based on an amount of time since the player has last wagered on a play of the game. For example, if the player returns to the gaming system within a short enough period of time (such as within four hours), the gaming system assigns the player to the group on which he or she was previously wagering. Thus, if a player ceases wagering on a gaming device of the gaming system, a sufficiently short amount of time passes, and the player returns or begins wagering again, the gaming system disclosed herein increases player excitement and enjoyment by enabling the player to continue wagering on the progressive award on which that player was most recently wagering.

Figure 9:
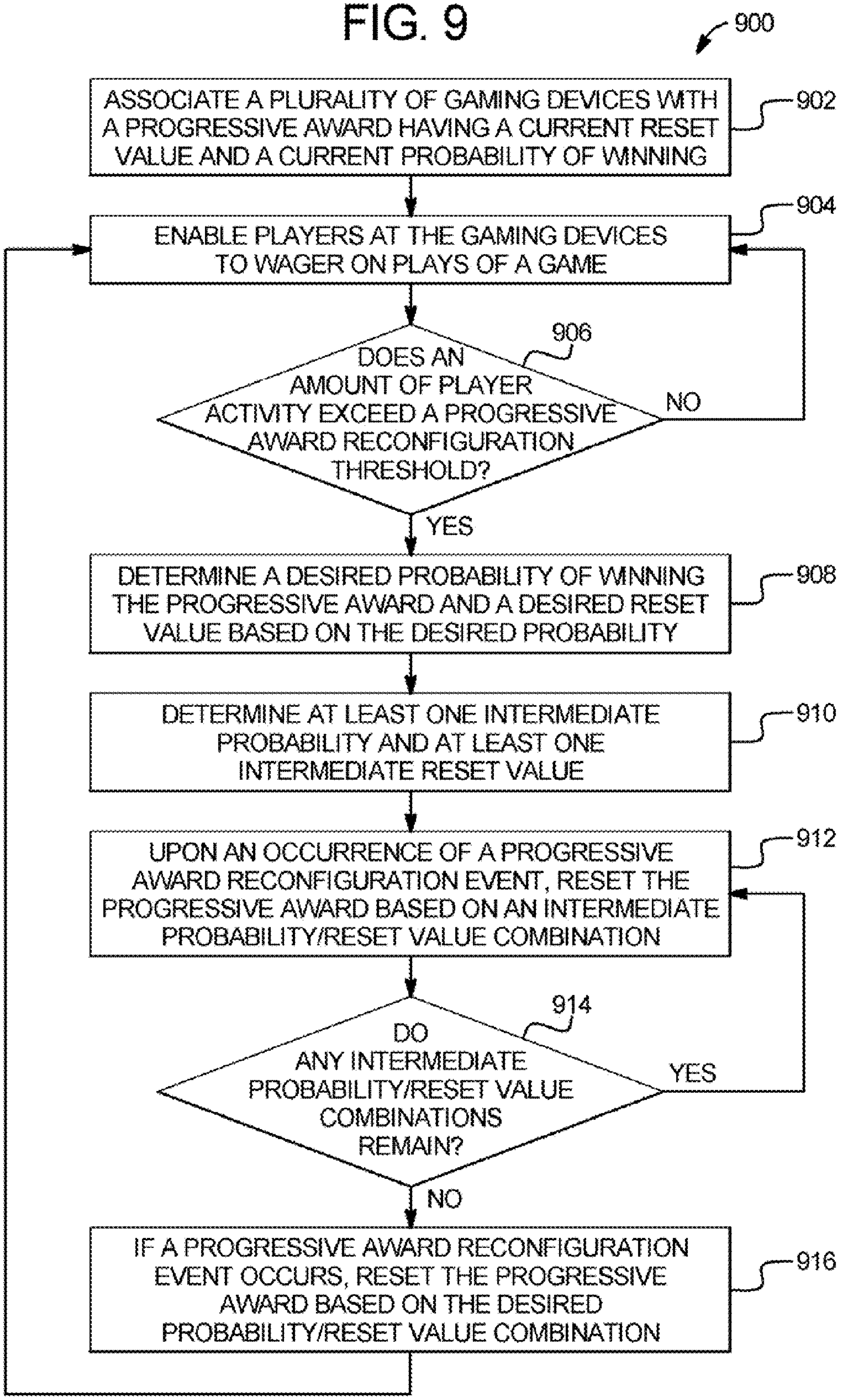
FIG. 9 is a flow chart of an example process for providing a desired game play experience with respect to a progressive award as disclosed herein by modifying the probability of winning the progressive award and by modifying the reset amount of the progressive award.

FIG. 9 illustrates a flow chart of an example process 900 for providing a consistent, desired game play experience from a range of game play experiences to a plurality of players by reconfiguring the progressive award associated with a group of gaming devices upon an occurrence of a progressive award reconfiguration event. Although the example process 900 is described with reference to the flow chart illustrated in FIG. 9, many other methods of operating a gaming system are contemplated. For example, the order of certain of the blocks may be changed, and certain of the blocks described are optional.

In the embodiment illustrated in FIG. 9, the gaming system associates a plurality of gaming devices with a progressive award having a current reset amount and a current probability of winning the progressive award, as indicated by block 902. The gaming system enables a plurality of players at the plurality of gaming devices to wager on plays of a game, as indicated by block 904. The gaming system is configured to provide the progressive award to one of the players if a play of the game results in a designated winning outcome.

The gaming system determines whether an amount of player activity exceeds a progressive award reconfiguration threshold, as indicated by decision diamond 906. If not, the gaming system continues to enable the players to wager on plays of the game, as indicated by block 904. It should be appreciated that if the player activity does not exceed the progressive award reconfiguration threshold, the gaming system does not alter the players' gaming experience with respect to the progressive award by reconfiguring the progressive award—that is, the gaming system does not change the probability or the reset amount associated with the progressive award.

If the player activity exceeds the progressive award reconfiguration threshold, as indicated by block 904, the gaming system determines that the progressive award needs to be reconfigured to maintain a gaming experience within a desired range of gaming experiences. To reconfigure the progressive award, the gaming system determines a desired probability of winning the progressive award and a desired initial or reset amount based on the desired probability, as indicated by block 908. In one embodiment, the gaming system determines this desired probability and reset amount based, at least in part, on the current amount of player activity. In another embodiment, the gaming system determines this desired probability and reset amount based on a desired gaming experience of the plurality of players of the gaming system.

Based on the desired probability and the desired reset amount, the gaming system also determines at least one intermediate probability and at least one intermediate reset amount, as indicated by block 910. Upon an occurrence of a progressive award reconfiguration event, the gaming system resets the progressive award based on one of the intermediate probability/reset amount combinations, as indicated by block 912. For example, after one of the players wins a progressive award, the gaming system resets the progressive award to an initial or reset amount based on one of the intermediate reset amounts, and determines whether an outcome of a play of the game results in the progressive award based on the intermediate probability.

After resetting the progressive award based on the intermediate probability/reset amount as described, the gaming system in one embodiment determines whether any further intermediate probability/reset amount combinations remain, as indicated by decision diamond 914. If so, the gaming system again waits for an occurrence of the progressive award reconfiguration event, and upon such an occurrence resets the progressive award based on one of the intermediate probability/reset amount combinations, as indicated by block 912. It should be appreciated that the gaming system applies the intermediate probability/reset amount combinations for a plurality of sequential progressive award reconfiguration events.

If the gaming system determines after an occurrence of a progressive award reconfiguration event that no intermediate progressive award/reset amount combinations remain, as indicated by decision diamond 914, the gaming system resets the progressive award for the next occurring progressive award reconfiguration event based on the desired progressive award/reset amount combination, as indicated by block 916. The gaming system then enables the players to continue wagering on plays of the game, as indicated by block 904, until the amount of player activity again exceeds the progressive award reconfiguration threshold. For such plays of the game, the gaming system provides the progressive award based on the previously determined desired probability/reset amount combination. The gaming system thus maintains a desired gaming experience for the players of the gaming system by altering the probability/reset amount combination of the progressive award to reconfigure the progressive award upon one or more occurrences of a progressive award reconfiguration event.

In one embodiment, the gaming system determines the desired probability/reset amount combination to represent a desired play experience to provide to the players. These new probability/reset amount combinations are usable as an alternative to the splitting and joining of groups discussed above. For example, if the gaming system determines that progressive awards are not achieving a desired average value, the gaming system adjusts the probability of winning such awards to provide progressive awards of appropriate values. The gaming system selects the plurality of intermediate probability/reset amount combinations such that players do not experience shifts in gaming experience, such as sudden increases in reset amounts. The intermediate probability/reset amount combinations thus enable the reset amount to change gradually over a plurality of progressive award reconfiguration events, such as a plurality of wins of the progressive awards, until the desired probability/reset amount combination is applied to the gaming system.

In one embodiment, the gaming system determines a desired probability/reset amount combination such that the desired probability is higher than the current probability and the desired reset amount is lower than the current reset amount. In this embodiment, the gaming system reconfigures the progressive award such that the progressive award is provided more frequently, but has an average value which is lower (i.e., due to the lower reset amount).

The gaming system selects a desired probability to maintain a desired rate of players the progressive award. In one embodiment, the gaming system also returns a constant percentage of each progressive award to the players. Thus, to achieve a desired probability, the gaming system alters the reset amount to maintain a constant percentage of each wager which is returned to the players. The gaming system determines the probability based on the following set of equations, wherein RTP(progressive award) is the amount of the progressive award which is returned to a player, RTP(reset) is the amount of the reset amount which is returned to the player, and RTP(growth) is the amount each qualifying wager which is returned to a player—that is, the amount of each qualifying wager which contributes to the growth of the progressive award.

In the situation wherein a proportion or percentage of each wager that qualifies a player to win a progressive (i.e., a portion of each qualifying wager) drives or contributes to the progressive award growth:

RTP(progressive award)=RTP(reset)+RTP(growth)

RTP(reset)=reset amount/qualifying wager amount/progressive hit probability

RTP(growth)=percentage determined by the gaming system

In all progressive systems, regardless of whether a player wager must be qualifying (i.e., of a significant magnitude) to enable the player to win a progressive award, and regardless of whether the progressive award growth is funded by portions of player wagers:

RTP(progressive award)=RTP(reset)+RTP(growth)

RTP(reset)=reset amount/qualifying wager amount/progressive hit probability

RTP(growth)=average growth*qualifying wager amount/progressive hit probability

In an example embodiment, the gaming system provides a progressive award to one of the players based on a probability of 1/10,000, wherein the reset amount of the progressive award is $100.00 and wherein each wager is $1.00. In this example, 1.0% of each wager is applied to the progressive award. The average progressive award is therefore equal to the $100.00 reset amount+10,000 games per cycle*$1.00 bet per game*1.0%, or $200.00. The RTP(progressive award) is therefore $200.00/$1.00/(1/10,000)=$200.00/($1.00*10,000)=2.0%. In this example, the gaming system determines that for the next progressive award cycle, the desired probability of providing the award is 1/20,000. The gaming system calculates the current percentage of the progressive award which is returned to the player as the sum of the percentage of the reset amount which is returned to the player and the percentage of each wager which is returned to the player. The percentage of the reset amount which is returned to the player is calculated as the reset amount divided by the wager amount divided by the probability of winning the progressive award. In the above example, the percentage of the reset amount returned to a player is thus calculated as $100.00 (reset)/$1.00 (wager)/1/10,000 (probability)=1.0%. In this example, the percentage of each wager which is returned to the player is defined by the gaming system to be 1.0%. Thus, the total percentage of the progressive award returned to the players is determined to be 2.0%.

Continuing the above example, the gaming system determines that a desired probability of winning is 1/20,000 and that the percentage of each wager to return to a player should remain constant at 2.0%. Since 1.0% of each wager is still applied to the progressive award, the gaming system determines that 1.0% of an unknown new reset amount should be applied to the progressive award at the new (known) probability of 1/20,000. Thus, the gaming system determines that a reset amount of $200.00 is appropriate for the change in probability indicated. This results in a percentage of the progressive award returned to the player calculated as $200.00 (new reset)/$1.00 (wager)/1/20,000 (new probability)=1.0%. To achieve the desired probability and to maintain a constant percentage of each wager which is returned to the player, the gaming system therefore doubles the reset amount in response to halving the probability.

In one embodiment, the gaming system determines the intermediate probability/reset amount combinations based on the difference between the current probability/reset amount combination and the desired probability/reset amount combination. The quantity of intermediate combinations can be determined based on a magnitude of difference between the current combination and the desired combination. In one embodiment, the gaming system determines a percentage of acceptable change for the reset amount, and selects a quantity of intermediate probability/reset amount combinations based on the determined percentage of acceptable change. For example, the gaming system determines that a reset amount change of 25% is an acceptable amount. The gaming system provides a progressive award with a current reset amount of $100.00 and determines a desired reset amount of $200.00. Thus, the gaming system determines that three intermediate reset amounts are appropriate, those reset amounts being $125.00, $150.00, and $175.00. In this embodiment, the gaming system selects intermediate probabilities to correspond with the selected intermediate reset amounts. Specifically, the gaming system selects intermediate probabilities of 1/12,500, 1/15,000, 1/17,500, and 1/20,000. Thus, the application of the plurality of probability/reset amounts can be summarized as below:

Reset 1: reset amount=$125.00; probability=1/12,500
Reset 2: reset amount=$150.00; probability=1/15,000
Reset 3: reset amount=$175.00; probability=1/17,500
Reset 4: reset amount=$200.00; probability=1/20,000

It should be appreciated that by applying the probability/reset amount combinations indicated, the gaming system changes the players' gaming experiences with respect to the progressive award to match the desired gaming experiences with respect to the progressive award over the course of four resets of the progressive award (i.e., over the course of four progressive award reconfiguration events).

In one embodiment, the gaming system does not apply a new intermediate probability/reset amount combination for each win of a progressive award following a determination that player activity exceeds the progressive award reconfiguration threshold. Rather, the gaming system determines that one or more progressive awards should be provided without applying a new probability/reset amount combination. The gaming system determines whether to apply an intermediate progressive award/reset amount combination based the value of the most recently-provided progressive award. For example, the gaming system does not apply a different intermediate probability/reset amount combination unless the previous progressive award had a value which was 40% larger than the different intermediate reset amount to be applied. The gaming system applies such a criterion to maintain a difference between the provided progressive award and the new reset amount which is sufficiently large. In various embodiments, whether a win of a progressive award constitutes a progressive award reconfiguration event is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

One embodiment of the gaming system disclosed herein is configured to determine a desired probability/reset amount combination and at least one intermediate probability/reset amount combination for a game associated with a progressive award wherein the determination of whether to provide the progressive award is based on a total amount of coin-in provided by the players wagering on plays of the game. The amount of coin-in which results in the award being provided (i.e., the mystery amount) is determined using a random determination associated with a probability. The process 900 described above with respect to FIG. 9 can be used to incrementally alter the probability associated with the determination as to when to provide the award based on accumulated coin-in, to continue to provide the players of the gaming system with desired gaming experiences within their desired range of experiences with respect to the progressive award. The gaming system disclosed herein may also generate probability/reset amount combinations for a game which includes a plurality of outcomes associated with varying awards. For example, the gaming system provides a plurality of non-progressive awards and at least one progressive award. In one embodiment, the disclosed system determines a desired probability/reset amount combination and any appropriate intermediate probability/reset amount combinations for any progressive awards, and incrementally applies the intermediate combinations upon a plurality of occurrences of the progressive award reconfiguration event. Alternatively, the gaming system does not alter the probability of obtaining the other, non-progressive awards, regardless of the amount of player activity.

In one embodiment, the gaming system disclosed herein provides an award based on a multiple stage outcome determination. Specifically, the disclosed system determines an outcome based on a first, natural probability according to a plurality of available outcomes. For example, if reel game has a total of 50,000 possible symbol combinations, and if only one of those combinations results in the player winning a progressive award, the natural probability of winning the progressive award is 1/50,000. In one embodiment, the gaming system makes a first determination of whether the player wins the progressive award for a play of the game based on this natural probability.

In one embodiment, the gaming system alters the natural probability of winning the progressive award by making an additional determination based on a different, variable probability if the first determination does not result in a winning symbol combination. In this embodiment, the actual probability of the player winning the award is calculated as the natural probability plus the variable probability minus the product of the natural probability and the variable probability. It should be appreciated that this product is subtracted because in the event that the player wins based on the natural probability, the gaming system does not make the secondary determination based on the variable probability. In one embodiment, the variable probability for such a multiple stage outcome determination is calculated as below, wherein FinalProb is the final probability of winning the progressive award, NaturalProb is the natural probability of winning the progressive award (i.e., based on the ratio of winning outcomes to total outcomes), and SecondProb is the variable, secondary probability applied by the gaming system:

$$\text{FinalProb}=\text{NaturalProb}+\text{SecondProb}-(\text{NaturalProb}*\text{SecondProb})$$

$$\text{SecondProb}-\text{NaturalProb}*\text{SeconProb}=(\text{FinalProb}-\text{NaturalProb})$$

$$\text{SecondProb}*(1-\text{NaturalProb})=(\text{FinalProb}-\text{NaturalProb})$$

$$\text{SecondProb}=(\text{FinalProb}-\text{NaturalProb})/(1-\text{NaturalProb})$$

Continuing the example above, wherein the natural probability of winning a progressive award is 1/50,000, the gaming system provides the award based on an actual probability of 1/10,000 by making a secondary determination based on a variable or secondary probability of 1/12,500. Specifically, the desired variable probability is calculated as follows:

$$\text{FinalProb}=1/10{,}000$$

$$\text{NaturalProb}=1/50{,}000$$

$$\text{SecondProb}=(1/10{,}000)-(1/50{,}000)/(1-(1/50{,}000))\sim 1/12{,}500$$

In one embodiment, the disclosed gaming system is configured to apply the process 900 described with respect to FIG. 9 to a game which determines whether a player wins a progressive award based upon a multiple stage determination as described above. In this embodiment, the gaming system determines the desired probability/reset amount combination as discussed above (i.e., to maintain the players' desired gaming experiences with respect to the progressive award), and calculates the necessary variable probability which, when applied as a second determination made after the determination based on the natural probability, results in an overall determination based on the desired probability. The gaming system further calculates any incremental probability/reset amount combinations and applies the probability/reset amount combinations upon occurrences of sequential progressive award reconfiguration events, as discussed above. It should thus be appreciated that the process 900 is applicable in any suitable gaming environment to enable an operator to provide players with awards based on suitable probability/reset amount combinations to provide the players with the desired gaming experiences with respect to the progressive award.

The features described above are applicable to other types of multiplayer games and/or multiplayer embodiments (i.e., games or environments other than those where players are competing for a particular progressive award). In one embodiment, the gaming system disclosed herein is implemented in the context of a perpetual multiplayer game or environment, such as the perpetual multiplayer game/environment described in U.S. Pat. No. 6,780,111, wherein players enter and exit a multiplayer embodiment depending on whether a bonus game triggering event has occurred. In this embodiment, the environment provides player with a common set of potential prizes. When one of the players wins or redeems one of the potential prizes, the other players' ability to also obtain that prize is impacted. The disclosed gaming system in one embodiment associates or disassociates players with one or more different bonus environments, such that the gaming experiences of the players in the bonus environments is consistently within a desired range of gaming experiences.

The disclosed gaming system advantageously automatically resets the parameters which are used by the gaming system to provide a progressive award winnable by players of a group of gaming devices. The disclosed gaming system also advantageously provides a desired gaming experience with respect to a progressive award to a plurality of players wagering on games of different groups of gaming devices. The disclosed system also advantageously provides a plurality of progressive awards associated with one or more groups which are provided to the players at a same hit frequency.

It should be appreciated that the gaming system disclosed herein advantageously balances a load on the gaming system, such that performance and connectivity bottlenecks and/or slow-downs are reduced are eliminated. In one embodiment, the gaming system disclosed herein enables a separate server to support or manage a designated quantity of progressive awards (e.g., one progressive award), and thereafter manages the quantity of gaming devices associated with that server based on the amount of player activity at such gaming devices. By associating and disassociating gaming devices to maintain a desired amount of player activity, performance can be maximized and slowdowns and bottlenecks can be reduced or eliminated.

The gaming system disclosed herein also increases player excitement and enjoyment by providing the fairest possible allocation of new players, particularly in relationship to systems that allocate players based on a first-come, first-served model or a round-robin model. Particularly, the disclosed gaming system advantageously allocates players at gaming devices to one of a plurality of groups of gaming devices by associating new gaming devices with a group which provides the best payback available. Alternatively or in addition, the disclosed gaming system advantageously allocates gaming devices to groups of gaming devices based on one or more of an average payback amount of a group of gaming devices, a payback associated with or appropriate to a players status (e.g., the amount of player wagering, the player's average wager size, a players status as a VIP, platinum level player, gold level player, etc.), or based on one or more business rules to be provided by the gaming system. In one embodiment, the gaming system enables a gaming operator to create, modify, or otherwise manage one or more business rules implemented by the disclosed system. In one embodiment, the gaming system enables the gaming operator to select or de-select one or more business rules. In another embodiment, the gaming system enables the operator to add or remove business rules.

The automated dynamic association and disassociation of gaming devices with groups of gaming devices provided by the disclosed gaming system also advantageously reduces problems associated with manual performance of the same tasks. For example, the automated dynamic association and disassociation obviates the need to have one or more individuals monitoring a plurality of groups of gaming devices and managing the gaming devices of those groups. Moreover, the gaming system reduces the inevitable human error that can result in unfair, non-advantageous, or otherwise undesirable association or disassociation of gaming devices with groups of gaming devices. Moreover, to the extent such allocation would be performed by marketing and/or administrative staff, the disclosed system automatically determines amounts of player activity, and adjusts the groups of gaming devices appropriately, without requiring any individual to perform complicated arithmetic. These advantages reduce the costs associated with training and maintaining staff to monitor the activity of gaming systems (which can vary substantially from day to day or hour to hour).

The gaming system disclosed herein advantageously obviates the need to require a game to be disabled upon a player winning a progressive award awaiting manual action by an authorized individual and/or notification or approval by a jurisdictional regulatory agency. Specifically, the gaming system disclosed herein advantageously enables a progressive award to be paid to a player, and any necessary adjustments to the players wagering on that progressive award to be made automatically and correctly upon the progressive award resetting. Alternatively, even if a particular group of gaming devices must be disabled upon a player winning the progressive award, (e.g., for manual analysis of some aspect of the progressive award win), the gaming system disclosed herein advantageously enables the gaming devices of that group of gaming devices to be re-allocated to a different, active group, such as by associating those gaming devices with a group of gaming devices whose progressive award value is near the reset amount of the previous group of gaming devices.

In an embodiment wherein the gaming system disclosed herein dynamically allocates physical gaming devices at gaming establishments (such as casinos) to groups of gaming devices, the gaming system disclosed herein reduces or eliminates the cost and labor associated with altering the groups of physical gaming devices. Since each physical gaming device is associated with a same gaming system, and the groups of gaming devices are dynamically maintained by that server throughout the plays of the game, the gaming system disclosed herein enables gaming establishments to alter associations of gaming devices with progressive awards without making changes to network infrastructure, device configuration, or other physical parameters of the gaming system. Elimination of these needs reduces the cost of modifying groups of gaming devices, and reduces the errors that come from inadvertently altering the structure of the network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a gaming system, the method comprising:

(a) during a first period of time:

(i) maintaining a first progressive award available to be won by a plurality of players at a group of gaming devices, (ii) determining a quantity indicative of wagering activities at the group of gaming devices, (iii) determining if the quantity indicative of wagering activities exceeds a progressive award reconfiguration threshold associated with the first progressive award, and (iv) if the quantity indicative of wagering activities exceeds the progressive award reconfiguration threshold, automatically:

(1) determining a first subset of the group of gaming devices, the first subset including a first quantity of the gaming devices, and (2) determining a second subset of the group of gaming devices, the second subset including a second quantity of the gaming devices, and (b) during a second period of time, if the progressive award reconfiguration event has occurred:

(i) maintaining the first progressive award available to be won by a first subset of the plurality of players at the gaming devices of the first subset of the group of gaming devices, wherein the first progressive award is not available to be won by the players at the gaming devices of the second subset of the group of gaming devices, and (ii) maintaining a second progressive award available to be won by a second subset of the plurality of players at the gaming devices of the second subset of the group of gaming devices, wherein the second progressive award is not available to be won by the players at the gaming devices of the first subset of the group of gaming devices.

2. The method of claim 1, wherein if the quantity indicative of wagering activities during the first period of time does not exceed the progressive award reconfiguration threshold, repeating (a)(ii) to (a)(iv).

3. The method of claim 1, wherein a sum of the first quantity of the gaming devices and the second quantity of the gaming devices is equal to a total quantity of the group of gaming devices.

4. The method of claim 1, wherein a quantity of less than all of the gaming devices is N gaming devices, the first quantity is N—Y gaming devices, and the second quantity is Y gaming devices.

5. The method of claim 1, wherein the quantity indicative of wagering activities is based on at least one selected from the group consisting of: an average wager value, a cumulative wager value, a wager frequency, and information indicative of a wagering history.

6. The method of claim 1, wherein the progressive award reconfiguration event includes one of the group of gaming devices generating an outcome associated with awarding the first progressive award.

7. The method of claim 1, wherein the progressive award reconfiguration event includes an event causing the progressive award to increment.

8. The method of claim 1, wherein the progressive award reconfiguration threshold is an upper progressive award reconfiguration threshold, and which includes, during the first period of time, determining if the quantity indicative of wagering activities is less than a lower progressive award reconfiguration threshold.

9. The method of claim 8, which includes, if the quantity indicative of wagering activities is less than the lower progressive award reconfiguration threshold, maintaining the first progressive award available to be won by the plurality of players at the group of gaming devices and at least one additional player at at least one additional gaming device.

10. The method of claim 9, wherein the additional gaming device is one of a group of gaming devices associated with another group of gaming devices.

11. The method of claim 1, which includes, during the second period of time, maintaining a third progressive award available to be won by both the players at the gaming devices of the first subset of the group of gaming devices and the players at the gaming devices of the second subset of the group of gaming devices.

12. The method of claim 1, which includes enabling one of the players to select between the first progressive award and the second progressive award based on a characteristic of the player stored in a player tracking system.

13. The method of claim 1, which includes:

(i) determining an actual probability of providing the first progressive award and determining an actual progressive award reset amount of the first progressive award, (ii) determining a desired probability of providing the first progressive award and determining a desired progressive award reset amount of the first progressive award based on the desired probability, (iii) during the second period of time, if the progressive award reconfiguration event has occurred, maintaining the first progressive award based on the desired probability of providing the first progressive award and based on the desired progressive award value.

14. The method of claim 1, which is operated through a data network.

15. The method of claim 14, wherein the data network is an internet.

* * * * *